US011843721B2

(12) United States Patent
Li et al.

(10) Patent No.: US 11,843,721 B2
(45) Date of Patent: *Dec. 12, 2023

(54) METHOD AND TERMINAL FOR SUPPORTING VOICE SERVICE AND DATA SERVICE SIMULTANEOUSLY

(71) Applicant: Huawei Technologies Co., Ltd., Shenzhen (CN)

(72) Inventors: Tao Li, Beijing (CN); Tao Li, Shenzhen (CN); Xin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,040

(22) Filed: Jul. 27, 2022

(65) Prior Publication Data
US 2023/0054710 A1 Feb. 23, 2023

Related U.S. Application Data

(63) Continuation of application No. 16/754,474, filed as application No. PCT/CN2017/106175 on Oct. 13, 2017, now Pat. No. 11,463,588.

(30) Foreign Application Priority Data

Oct. 9, 2017 (CN) .......................... 201710931792.8

(51) Int. Cl.
*H04M 7/00* (2006.01)
*H04W 88/06* (2009.01)

(52) U.S. Cl.
CPC ......... *H04M 7/0024* (2013.01); *H04M 7/006* (2013.01); *H04W 88/06* (2013.01)

(58) Field of Classification Search
CPC ... H04M 7/0024; H04M 7/006; H04W 88/06; H04W 8/183; H04W 36/14; H04W 76/15; H04W 76/22
See application file for complete search history.

(56) References Cited

U.S. PATENT DOCUMENTS 10,412,591 B2 9/2019 Su et al.
2013/0156081 A1 6/2013 Tat et al.
(Continued)

FOREIGN PATENT DOCUMENTS

CN 103987099 A 8/2014
CN 105532027 A 4/2016
(Continued)

OTHER PUBLICATIONS

Ilyrike et al., "[From Application Layer to Framework] The mobile network turns off the data access process," Jan. 29, 2013, 9 pages.

*Primary Examiner* — Steven Hieu D Nguyen
(74) *Attorney, Agent, or Firm* — Conley Rose, P.C.

(57) ABSTRACT

A terminal supports two cards the primary card and the secondary card, the primary card supports a data service, and the secondary card supports transmission of a voice service using a data service, or the secondary card supports concurrent transmission of a voice service and a data service. The method includes, when the terminal performs the data service using the primary card, if the terminal performs the voice service using the secondary card, switching, by the terminal, the data service performed using the primary card to the secondary card, and performing the data service using the secondary card.

21 Claims, 22 Drawing Sheets

(56) References Cited

U.S. PATENT DOCUMENTS

| | | |
|---|---|---|
| 2014/0140287 A1* | 5/2014 | Cheng .................. H04W 76/10 |
| | | 370/329 |
| 2014/0213321 A1 | 7/2014 | Chen et al. |
| 2014/0220981 A1 | 8/2014 | Jheng et al. |
| 2015/0094071 A1* | 4/2015 | Hang .................. H04W 76/19 |
| | | 455/450 |
| 2015/0139181 A1 | 5/2015 | Cheng et al. |
| 2015/0373661 A1* | 12/2015 | Fulzele .............. H04W 60/005 |
| | | 455/435.2 |
| 2016/0029222 A1* | 1/2016 | Su ........................ H04W 16/14 |
| | | 370/329 |
| 2016/0044178 A1 | 2/2016 | Narayanaswamy et al. |
| 2017/0280380 A1 | 9/2017 | Gundu et al. |
| 2019/0069224 A1 | 2/2019 | Lee et al. |

FOREIGN PATENT DOCUMENTS

| | | |
|---|---|---|
| CN | 106130618 A | 11/2016 |
| CN | 106131815 A | 11/2016 |
| CN | 106231587 A | 12/2016 |
| WO | 2015047834 A1 | 4/2015 |
| WO | 2015179069 A1 | 11/2015 |

\* cited by examiner

METHOD AND TERMINAL FOR SUPPORTING VOICE SERVICE AND DATA SERVICE SIMULTANEOUSLY

CROSS-REFERENCE TO RELATED APPLICATIONS

This is a continuation of U.S. patent application Ser. No. 16/754,474 filed on Apr. 8, 2020, which is a U.S. National Stage of International Patent Application No. PCT/CN2017/106175 filed on Oct. 13, 2017, which claims priority to Chinese Patent Application No. 201710931792.8 filed on Oct. 9, 2017. All of the aforementioned applications are hereby incorporated by reference in their entireties.

TECHNICAL FIELD

This application relates to the communications field, and in particular, to a method and a terminal for supporting a voice service and a data service simultaneously.

BACKGROUND

As internet protocol (Internet Protocol, IP) multimedia subsystem (IP Multimedia Subsystem, IMS) network construction of an operator develops, a quantity of users of a voice over long term evolution (Long Term Evolution, LTE) (Voice over LTE, VoLTE) service is growing. A data service and a voice service can be performed simultaneously on a same card by using the VoLTE service. To be specific, a user can access the internet when making/answering a call.

However, a current dual SIM dual standby (Dual SIM Dual Standby, DSDS) single pass phone has only one radio frequency antenna. Therefore, only one card can be used as a 4G primary card to support a data service such as VoLTE, and the other card can be used only as a secondary card. Additionally, regardless of whether 4G is enabled on the secondary card, the secondary card can provide only a 2G/3G capability. When a user performs a data service by using the primary card, if the secondary card is used in a call, in this case, because the radio frequency antenna is exclusively occupied by the secondary card, the data service performed by using the primary card is interrupted, and a phone can hardly provide the data service to the user.

SUMMARY

Embodiments of this application provide a method and a terminal for supporting a voice service and a data service simultaneously, to switch, when a dual SIM dual standby single pass phone performs a data service by using a primary card and then a secondary card is used in a call, the data service to the secondary card, so that the data service can be transmitted by using the secondary card that is being used in the call.

To achieve the foregoing objectives, the following technical solutions are used in the embodiments of this application.

According to a first aspect, a method for supporting a voice service and a data service simultaneously is provided, and is applied to a dual SIM dual standby single pass terminal. The terminal supports two cards: a primary card and a secondary card, the primary card supports a data service, and the secondary card supports transmission of a voice service by using a data service, or the secondary card supports concurrent transmission of a voice service and a data service; and the method includes: when the terminal performs the data service by using the primary card, if the terminal performs the voice service by using the secondary card, switching, by the terminal, the data service performed by using the primary card to the secondary card, and performing the data service by using the secondary card.

In the method for supporting a voice service and a data service simultaneously provided in this embodiment of the present invention, although by default, a dual SIM dual standby single pass phone can perform the data service only by using the primary card, when a VoLTE voice service or a WCDMA voice service is performed by using the secondary card, the voice service and the data service may be transmitted simultaneously by using a modem corresponding to the secondary card. In this way, when the dual SIM dual standby single pass phone performs the data service by using the primary card, if the secondary card is used in a call, the data service is migrated to the secondary card, so that the data service can be transmitted by using the secondary card that is being used in the call.

In a possible implementation, the method may further include: displaying, by the terminal, an option interface, and content displayed in the option interface is used to indicate that mobile data is switched from the primary card to the secondary card when the voice service is performed by using the secondary card. This implementation can help a user intuitively learn that a default mobile data option changes.

It may be understood that, the option interface may be, for example, an option interface displayed in a setting interface displayed based on triggering of a user, or may be an option interface displayed in a dual SIM management option displayed in a setting interface displayed based on triggering of a user, or may be understood as an option interface displayed in a mobile network setting option displayed in a setting interface displayed based on triggering of a user. That the content displayed in the option interface is used to indicate that the default mobile data is switched from the primary card to the secondary card when the voice service is performed by using the secondary card may be understood as a function. The option interface is not required to display the sentence "the default mobile data is switched from the primary card to the secondary card when the voice service is performed by using the secondary card", provided that a function of the content displayed in the option interface is implemented.

In a possible implementation, the method may further include: displaying, by the terminal, first prompt information, and the first prompt information is used to indicate that the default mobile data is switched from the primary card to the secondary card when the voice service is performed by using the secondary card. This implementation can help a user intuitively learn that a default mobile data option changes.

It may be understood that, a function of the first prompt information is to indicate that the default mobile data is switched from the primary card to the secondary card when the voice service is performed by using the secondary card. The first prompt information is not required to display the sentence "the default mobile data is switched from the primary card to the secondary card when the voice service is performed by using the secondary card", provided that the function of the first prompt information is implemented.

In a possible implementation, the method may further include: ending, by the terminal, the voice service performed by using the secondary card, switching the data service performed by using the secondary card to the primary card, and performing the data service by using the primary card. This implementation can ensure that after a call on the secondary card ends, the data service is automatically switched back to the primary card, to ensure that the data service can continue to be used.

In a possible implementation, the method may further include: displaying, by the terminal, an option interface, and content displayed in the option interface is used to indicate that the default mobile data is switched from the secondary card to the primary card after the voice service performed by using the secondary card ends. This implementation can help a user intuitively learn that a default mobile data option changes.

It may be understood that, that the content displayed in the option interface is used to indicate that the default mobile data is switched from the secondary card to the primary card after the voice service performed by using the secondary card ends may be understood as a function. The option interface is not required to display the sentence "the default mobile data is switched from the secondary card to the primary card after the voice service performed by using the secondary card ends", provided that a function of the content displayed in the option interface is implemented.

It may be understood that, the option interface may be, for example, an option interface displayed in a setting interface displayed based on triggering of a user, or may be an option interface displayed in a dual SIM management option displayed in a setting interface displayed based on triggering of a user, or may be understood as an option interface displayed in a mobile network setting option displayed in a setting interface displayed based on triggering of a user.

In a possible implementation, the method may further include: displaying, by the terminal, second prompt information, and the second prompt information is used to indicate that the default mobile data is switched from the secondary card to the primary card after the voice service performed by using the secondary card ends. This implementation can help a user intuitively learn that a default mobile data option changes.

It may be understood that, a function of the second prompt information is to indicate that the default mobile data is switched from the secondary card to the primary card after the voice service performed by using the secondary card ends. The second prompt information is not necessarily required to display the sentence "the default mobile data is switched from the secondary card to the primary card after the voice service performed by using the secondary card ends", provided that the function of the second prompt information is implemented.

In a possible implementation, the method may further include: displaying, by the terminal, an option interface, and content displayed in the option interface is used to indicate whether a function that the internet can be accessed by using the secondary card that is being used in a call is enabled. This implementation helps a user to control the function to be enabled/disabled.

In a possible implementation, the dual SIM dual standby single pass means that the two cards are standby, but only a single card can be used for calls. This embodiment provides a specific meaning of the dual SIM dual standby single pass.

According to a second aspect, a terminal is provided. The terminal is a dual SIM dual standby single pass terminal, the terminal supports two cards: a primary card and a secondary card, the terminal includes an application processor, a modem corresponding to the primary card, and a modem corresponding to the secondary card, the primary card supports a data service, the secondary card supports transmission of a voice service by using a data service, or the secondary card supports concurrent transmission of a voice service and a data service, and the application processor is configured to: when the data service is performed by using the modem corresponding to the primary card, if the voice service is performed by using the modem corresponding to the secondary card, switch the data service performed by using the modem corresponding to the primary card to the modem corresponding to the secondary card, and perform the data service by using the modem corresponding to the secondary card. Based on a same inventive concept, for a problem-resolving principle and beneficial effects of the terminal, refer to the first aspect, the possible method implementations of the first aspect, and brought beneficial effects. Therefore, for implementation of the terminal, refer to the first aspect and the possible method implementations of the first aspect. Details are not repeated.

According to a third aspect, an electronic device is provided. The electronic device includes: a display, one or more processors, a memory, and one or more programs. The one or more programs are stored in the memory and are configured to be executed by the one or more processors, and the one or more programs include an instruction for the following operations: when a user interface including a setting icon is displayed on the display, displaying a setting option in response to a first input, where the setting option includes a first option; and displaying a first option interface in response to a second input, where the first option interface includes at least one area, and the at least one area displays a default mobile data option and an option that the internet can be accessed by using a secondary card that is being used in a call.

The secondary card supports transmission of a voice service by using a data service, or the secondary card supports concurrent transmission of a voice service (for example, VoLTE) and a data service (for example, WCDMA).

In a possible implementation, the first option is a dual SIM management option, or the first option is a mobile network setting option.

According to a fourth aspect, a computer storage medium storing one or more programs is provided. The one or more programs include an instruction, and when a terminal executes the instruction, the terminal is enabled to perform the method in the first aspect and any implementation of the first aspect.

According to a fifth aspect, a computer program product that includes an instruction is provided. When the computer program product is run on a terminal, the terminal is enabled to perform the method in the first aspect and any implementation of the first aspect.

The third aspect to the fifth aspect provided in the embodiments of the present invention are used to perform the corresponding method provided in the first aspect. Therefore, for beneficial effects that can be achieved in the third aspect to the fifth aspect, refer to beneficial effects in the corresponding method provided in the first aspect.

BRIEF DESCRIPTION OF DRAWINGS

To describe technical solutions in this application or in the prior art more clearly, the following briefly describes accompanying drawings required for describing the embodiments or the prior art.

DESCRIPTION OF EMBODIMENTS

Figure 1:
FIG. 1 is a schematic front view of a phone according to an embodiment of the present invention.
Figure 2:
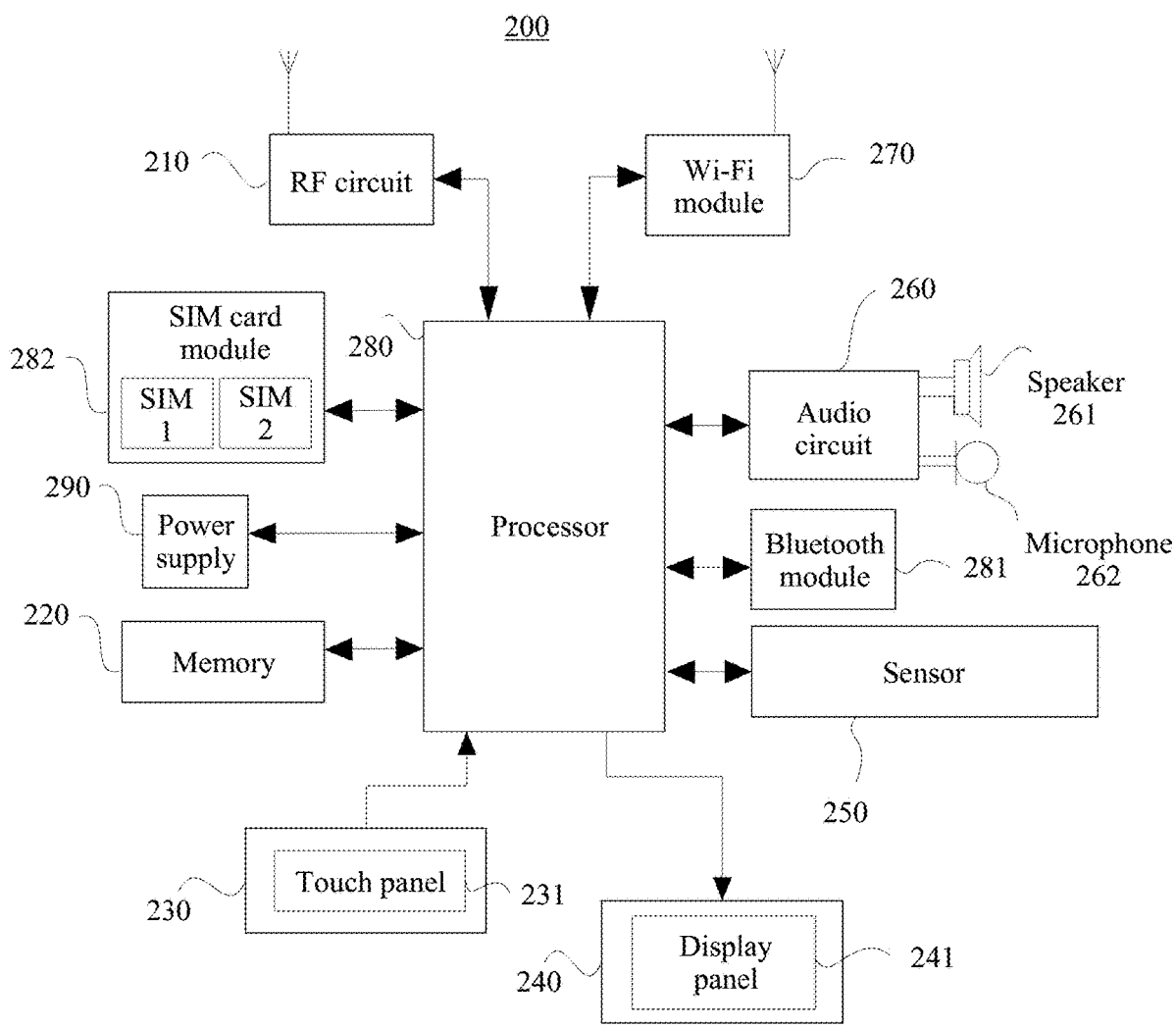
FIG. 2 is a schematic structural diagram of a phone according to an embodiment of the present invention.

A terminal in the embodiments of the present invention may be any terminal device that supports dual SIM dual standby single pass. The dual SIM dual standby single pass means that two SIM cards of a phone are subject to constant switching between respective networks of the two SIM cards by using underlying software and a control chip of the phone. Because the switching is very quick, it is ensured that the two SIM cards are standby, but only a single card can be used for calls. In other words, a card B is in an offline state when a card A is used for a call, the card A is in the offline state when the card B is used for a call, and the two cards are both in a standby mode when neither of the two cards is used for a call. The terminal may be a wearable electronic device (for example, a smartwatch), a tablet computer, a desktop computer, a virtual reality apparatus, an augmented reality apparatus, or the like, or may be a phone 200 shown in FIG. 1 or FIG. 2. A specific form of the terminal is not particularly limited in the embodiments of the present invention. In the following embodiment, how the terminal implements a specific technical solution in the embodiment is described by using a phone as an example. As shown in FIG. 1 or FIG. 2, the terminal in the embodiments of the present invention may be the phone 200. FIG. 1 is a schematic front view of the phone 200. FIG. 2 is a schematic structural diagram of hardware of the phone 200. The following embodiment is specifically described by using the phone 200 as an example.

It should be understood that the phone 200 shown in the figure is merely an example of the terminal, and the phone 200 may have more or fewer components than those shown in the figure, and may have two or more components combined or have different components.

As shown in FIG. 2, the phone 200 may include components such as a radio frequency (Radio Frequency, RF) circuit 210, a memory 220, an input unit 230, a display unit 240, a sensor 250, an audio circuit 260, a wireless fidelity (Wireless Fidelity, Wi-Fi) module 270, a processor 280, a Bluetooth module 281, a SIM card module 282, and a power supply 290. A person skilled in the art may understand that a structure of the phone shown in FIG. 2 does not constitute a limitation on the phone, and the phone may include more or fewer components than those shown in the figure, may have some components combined, or may have a different component arrangement.

The following describes the components of the phone 200 in detail with reference to FIG. 2.

The RF circuit 210 may be configured to receive and send signals in an information receiving and sending process or a call process. The RF circuit 210 may receive downlink information from a base station, and then transmit the downlink information to the processor 280 for processing; and send uplink data to the base station. Usually, the RF circuit includes but is not limited to devices such as an antenna, at least one amplifier, a transceiver, a coupler, a low noise amplifier, and a duplexer. Additionally, the RF circuit 210 may further communicate with a network and another mobile device through wireless communication. The wireless communication may use any communications standard or protocol, including but not limited to a global system for mobile communications, a general packet radio service, code division multiple access, wideband code division multiple access, long term evolution, email, and a short message service.

The memory 220 may be configured to store a software program and data. The processor 280 runs the software program and/or the data stored in the memory 220, to perform various functions and data processing of the phone 200. The memory 220 may mainly include a program storage area and a data storage area. The program storage area may store an operating system, an application program required by at least one function (such as a sound playback function and an image playback function), and the like. The data storage area may store data (such as audio data and a phone book) that is created based on use of the phone 200, and the like. Additionally, the memory 220 may include a high-speed random access memory, and may further include a non-volatile memory, for example, at least one magnetic disk storage device, a flash memory, or another volatile solid-state storage device. In the following embodiment, the memory 220 stores an operating system that enables the phone 200 to run, for example, an iOS® operating system developed by Apple Inc., an Android® open source operating system developed by Google LLC, or a Windows® operating system developed by Microsoft Corporation.

The input unit 230 (for example, a touchscreen) may be configured to: receive entered numeric or character information, and generate a signal input related to user setting and function control of the phone 200. Specifically, the input unit 230 may include a touch panel 231 that is shown in FIG. 1 and that is disposed in the front of the phone 200. The touch panel 231 may collect a touch operation of a user on or near the touch panel 231 (for example, an operation performed by the user on or near the touch panel 231 by using any suitable object or accessory such as a finger or a stylus), and drive a corresponding connection apparatus based on a preset program.

The display unit 240 (namely, a display screen) may be configured to display information entered by the user or information provided for the user, and graphical user interfaces (Graphical User Interface, GUI) of various menus of the phone 200. The display unit 240 may include a display panel 241 that is disposed in the front of the phone 200. The display panel 241 may be configured in a form of a liquid crystal display, a light-emitting diode, or the like.

As shown in FIG. 1, in some embodiments, the touch panel 231 and the display panel 241 may be disposed in the front of the phone 200, and the touch panel 231 covers the display panel 241. The touch panel 231 detects a touch operation on or near the touch panel 231, and then transfers the touch operation to the processor 280 to determine a touch event. Then the processor 280 provides a corresponding visual output on the display panel 241 based on a type of the touch event. Although in FIG. 2, the touch panel 231 and the display panel 241 implement input and input functions of the phone 200 as two independent components, in some embodiments, the touch panel 231 and the display panel 241 may be integrated to implement the input and output functions of the phone 200, and the integrated touch panel 231 and display panel 241 may be referred to as a touch display screen or a display screen for short. In this embodiment of the present invention, the terminal displays an interface, a message, and the like by using the display screen.

The phone 200 may further include at least one sensor 250, such as an optical sensor, a motion sensor, and other sensors. For other sensors that may be further configured in the phone 200, such as a gyroscope, a barometer, a hygrometer, a thermometer, and an infrared sensor, details are not described herein.

The audio circuit 260, a speaker 261, and a microphone 262 may provide an audio interface between the user and the phone 200. The audio circuit 260 may convert received audio data into an electrical signal and transmit the electrical signal to the speaker 261, and the speaker 261 converts the electrical signal into a sound signal for output. Additionally, the microphone 262 converts a collected sound signal into an electrical signal, and the audio circuit 260 receives the electrical signal, converts the electrical signal into audio data, and then outputs the audio data to the RF circuit 210, to send the audio data to, for example, another phone, or outputs the audio data to the memory 220 for further processing.

Wi-Fi is a short-range wireless transmission technology. The phone 200 may help, by using the Wi-Fi module 270, the user to receive and send emails, browse a web page, access streaming media, and the like. The Wi-Fi module 270 provides wireless broadband internet access for the user.

The processor 280 is a control center of the phone 200, and is connected to various parts of the entire phone by using various interfaces and lines. By running or executing the software program stored in the memory 220 and invoking the data stored in the memory 220, the processor 280 performs various functions and data processing of the phone 200, to perform overall monitoring on the phone. In some embodiments, the processor 280 may include one or more processing units. The processor 280 may further integrate an application processor and a modem. The application processor mainly processes an operating system, a user interface, an application program, and the like. The modem mainly processes wireless communication. It may be understood that the modem may alternatively not be integrated into the processor 280, and the modem and the application processor are disposed separately. For a dual SIM dual standby single pass terminal, a modem may include a modem corresponding to a primary card and a modem corresponding to a secondary card.

The Bluetooth module 281 is configured to exchange information with another device by using a short-range communications protocol such as Bluetooth. For example, the phone 200 may establish, by using the Bluetooth module 281, a Bluetooth connection to a wearable electronic device (for example, a smartwatch) that also has a Bluetooth module, to exchange data.

The phone 200 further includes the power supply 290 (such as a battery) that supplies power to the components. The power supply may be logically connected to the processor 280 by using a power supply management system, to implement functions such as charging, discharging, and power consumption management by using the power supply management system.

Figure 3A:
FIG. 3A, FIG. 3B, and FIG. 3C are a schematic diagram 1 of a display interface according to an embodiment of the present invention.
Figure 3B:
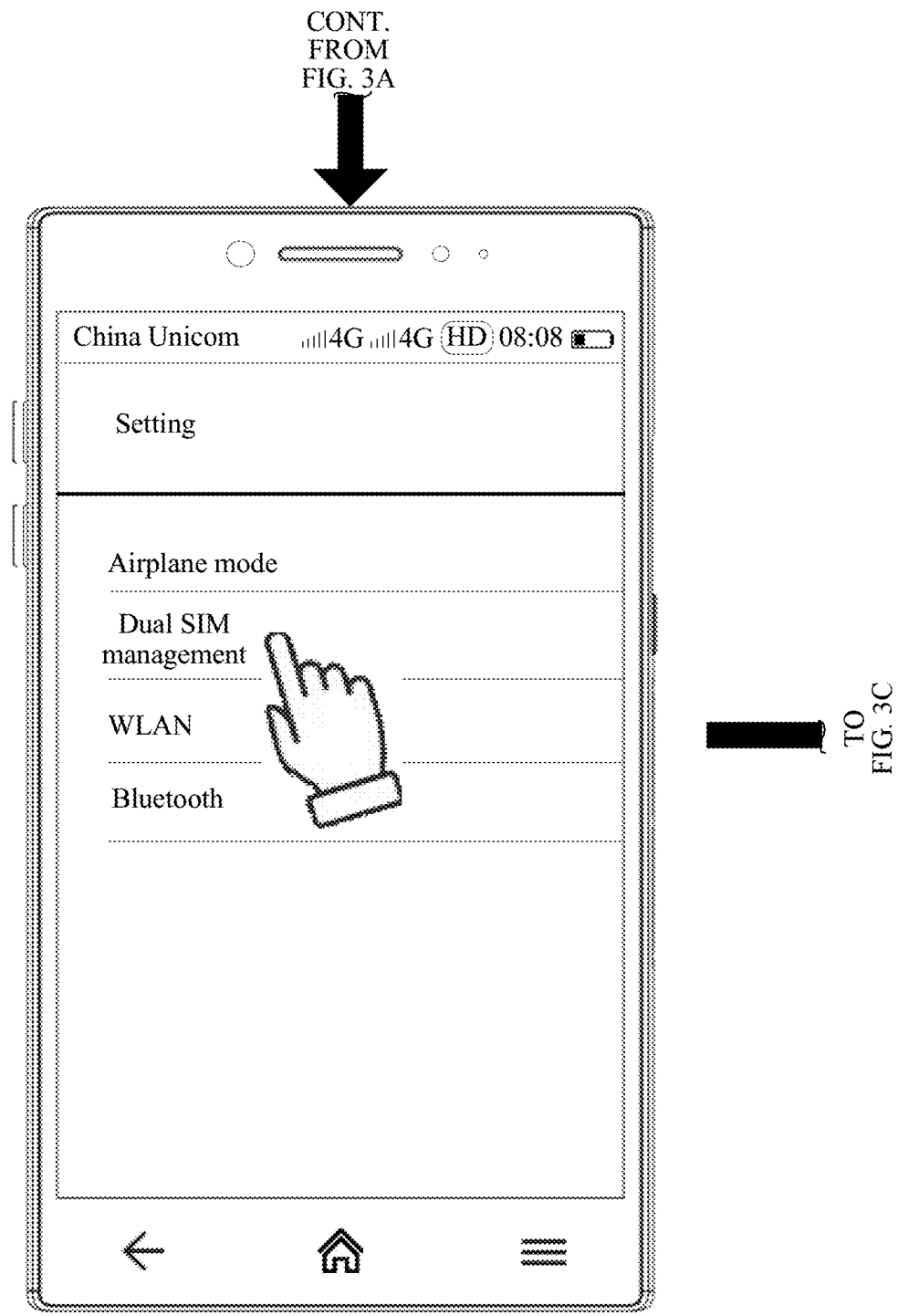
Figure 3C:
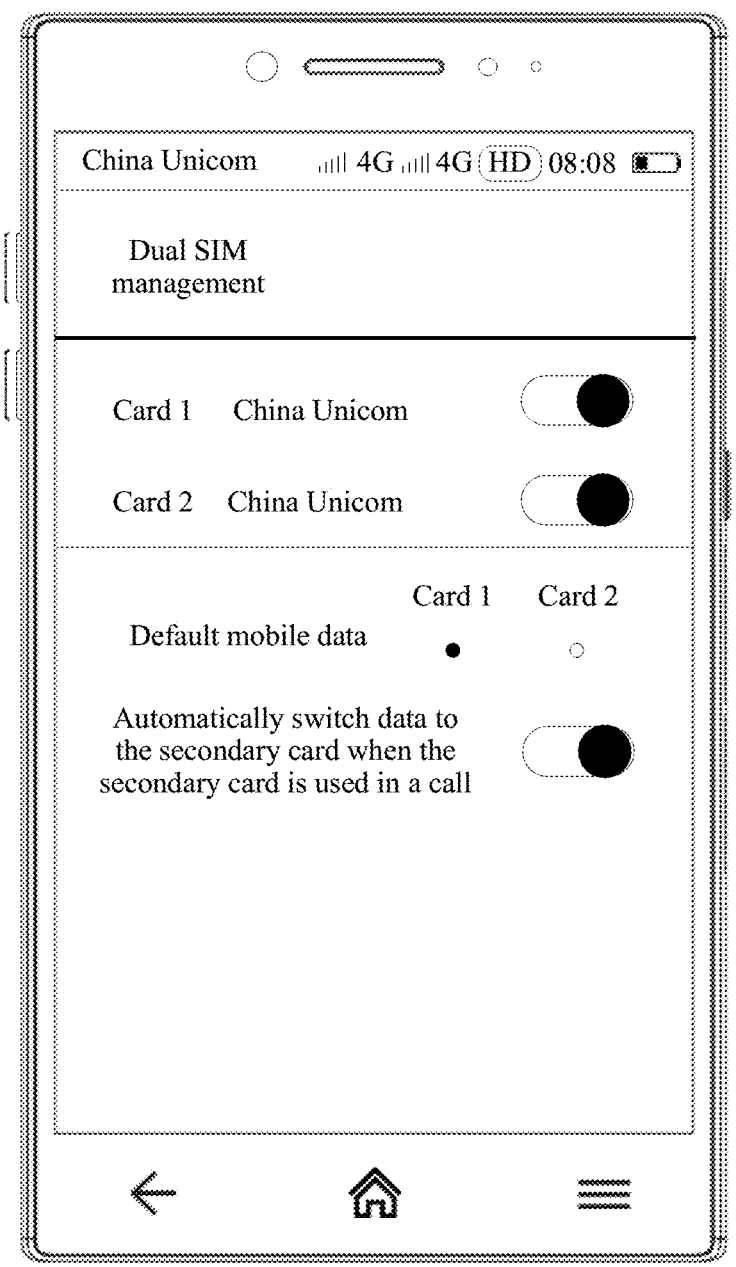

The SIM card module 282 is configured to receive inserted SIM cards of various specifications, for example, a nano SIM card and a micro SIM card. The SIM card module 282 in this embodiment supports insertion of at least two SIM cards: a SIM 1 and a SIM 2. For dual SIM dual standby single pass, one of the two cards is a primary card, and the other is a secondary card. The primary card supports a data service by default. In other words, the terminal is set to perform the data service by using the primary card by default. The secondary card supports transmission of a voice service (for example, VoLTE) by using a data service or supports concurrent transmission (for example, in wideband code division multiple access (Wideband Code Division Multiple Access, WCDMA)) of a voice service and a data service. For ease of description, this embodiment of the present invention is described by using an example in which the secondary card performs a VoLTE voice service or a WCDMA voice service, but this does not intend to limit the secondary card supports only the VoLTE voice service or the WCDMA voice service. The data service described in this embodiment of the present invention includes a mobile data service. It may be understood that, the primary card supports the data service by default, and the primary card may also support the voice service. Accordingly, referring to FIG. 1, signal strength and a supported network standard of the at least two SIM cards may be displayed on the display panel 241. It should be noted that, the SIM card module may alternatively be implemented as a virtual SIM card function, or the SIM card module may alternatively be a soft SIM card. In this embodiment of the present invention, the voice service includes services such as making/answering a call, or a video call, and the data service includes but is not limited to services such as browsing a web page, playing an online game, buffering a video, downloading data, and uploading data. Referring to FIG. 3A, FIG. 3B, and FIG. 3C, when the terminal displays a user interface including a setting icon on a display screen, the user may tap the setting icon to display a setting interface. The user may tap a dual SIM management option in setting options in the setting interface of the terminal to enter a dual SIM management option interface. The option interface includes at least one area, and a default mobile data option may be displayed in the at least one area. In the default mobile data option, the user may set a SIM card (for example, a card 1) that uses mobile data by default to be a primary card, and set the other SIM card (for example, a card 2) to be a secondary card. In this way, when the user is not on a call or the primary card is used in a call, the data service may be performed by using the primary card. It may be understood that, in the default mobile data option, the user may alternatively set the card 2 to be the primary card that uses the mobile data by default, and set the card 1 to be the secondary card. Additionally, the "default mobile data" shown in FIG. 3A, FIG. 3B, and FIG. 3C means that the mobile data is used by default, and may also be referred to as "mobile data for internet access", "data for internet access", or the like. Alternatively, the "default mobile data" option may not be displayed in the dual SIM management option interface but be displayed in another setting interface. This is not limited in this embodiment of the present invention.

Figure 4:
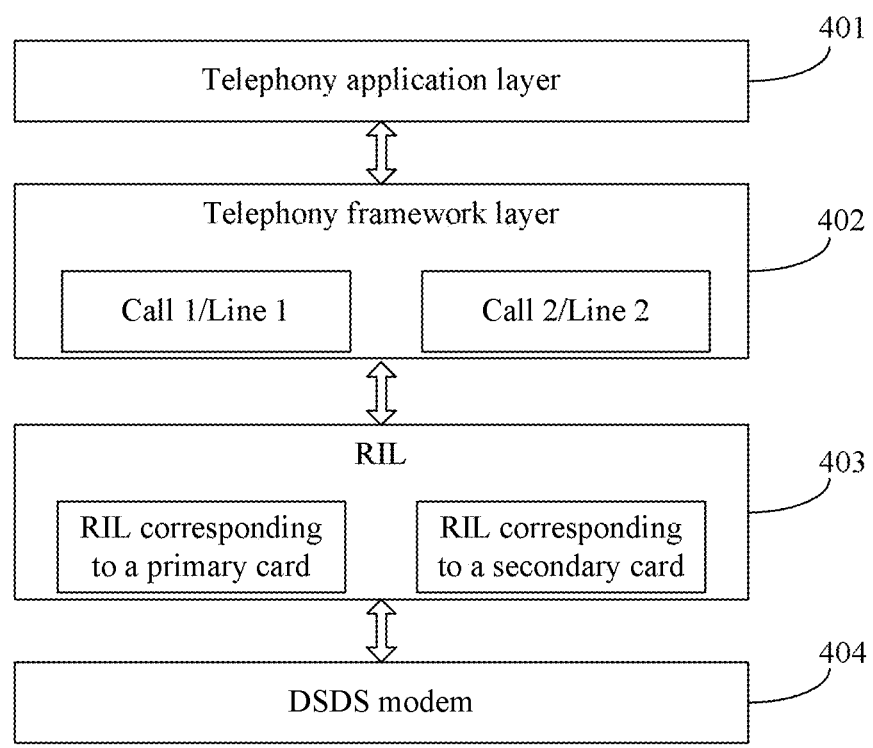
FIG. 4 is a schematic diagram of a system architecture of a dual SIM dual standby single pass terminal device based on an Android system according to an embodiment of the present invention.

FIG. 4 is a schematic diagram of a system architecture of a dual SIM dual standby single pass terminal device based on an Android system according to an embodiment of the present invention. The system architecture includes a telephony application (Telephony Application) layer 401, a telephony framework (Telephony Framework) layer 402, a radio interface layer (Radio Interface Layer, RIL) 403, and a DSDS modem (Modem) 404. The telephony application layer 401, the telephony framework layer 402, and the RIL 403 run in an application processor, and the DSDS modem 404 runs in a modem.

The telephony application layer 401 includes communications-related applications such as a call application, an SMS message application and/or an MMS message application, and a contact application. The telephony application layer 401 may access, based on different applications, a service provided by the telephony framework layer 402, for example, may access, when a call is made, a telephony interface management service provided by the telephony framework layer 402.

The telephony framework layer 402 is configured to provide a communications-related API and service for the telephony application layer 401, and send a corresponding command to the RIL 403 based on a service accessed by the telephony application layer 401. For example, in a scenario in which a call is to be accepted, the telephony framework layer 402 may send a command of accepting the call to the RIL 403. The service provided by the telephony framework layer 402 includes, for example, the telephony interface management service, a phone book service, an SMS message service, a user information reading service, a message registration service, and the like. The API provided by the telephony framework layer 402 is used by the telephony application layer 401 to access the service provided by the telephony framework layer 402. For a call, the telephony framework layer 402 instantiates a phone (Phone) object or a line (Line) object for each SIM card. For a dual SIM dual standby single pass terminal, it means that two phone (Phone) objects or line (Line) objects are instantiated, to respectively manage a call on a primary card or a call on a secondary card. However, the telephony framework layer 402 maintains only one data connection for a data service.

The RIL 403 is responsible for translating the command from the telephony framework layer 402 into a modem instruction, and sending the modem instruction to the DSDS modem 404. The RIL 403 may also receive a processing result fed back by the DSDS modem 404. The RIL 403 includes RILJ (RIL JAVA) and RILC (RIL CPP or RILD). The RILJ is a Java part of the RIL 403, and can be directly invoked by the telephony framework layer 402. The RILC is a C/C++ part of the RIL 403. The RILC communicates with the RILJ by using a socket (Socket). The RILC is a server end of the Socket, and the RILJ is a client of the Socket. The RILC may obtain a command (for example, a command of accepting a call or a command of rejecting a call) from the telephony framework layer 402 by listening on the Socket. The RILC sends the modem instruction to the DSDS modem 404 through serial communication. The RIL 403 is configured to communicate with an underlying modem, and the primary card and the secondary card correspond to different modems respectively. Therefore, the RIL 403 includes a RIL corresponding to the primary card and a RIL corresponding to the secondary card. The RIL corresponding to the primary card is configured to manage a call and a data connection of the primary card, and the RIL corresponding to the secondary card is configured to manage a call and a data connection of the secondary card.

The DSDS modem 404 is responsible for executing the modem instruction, and interacting with a network side by using a radio frequency antenna, to implement a communications service. For the dual SIM dual standby single pass terminal, each SIM card corresponds to one modem.

It should be noted that, although this embodiment of the present invention is described by using the Android system as an example, a basic principle in this embodiment is also applicable to a terminal based on an operating system such as iOS or Windows.

For example, when the primary card is used to make a call, the call application in the telephony application layer 401 accesses the telephony interface management service in the telephony framework layer 401 and clears a call in a non-connected mode in the telephony framework layer 401. If a call is currently ongoing, the current call is switched to background, and a call state of the current call is switched to a call hold state. It is checked whether a called number is valid. If the number is valid, the telephony framework layer 401 sends a call command to the RIL corresponding to the primary card in the RIL 403, the RIL corresponding to the call on the primary card in the RIL 403 translates the command into a modem instruction of making the call and sends the modem instruction to a modem corresponding to the primary card in the DSDS modem 404, and the modem corresponding to the primary card in the DSDS modem 404 specifically executes an operation of making the call.

For example, when the primary card is used to perform the data service, a network application in the telephony application layer 401 accesses a connection service corresponding to the primary card in the telephony framework layer 401, sets a data connection parameter in the telephony framework layer 401, and switches a data connection from an inactivated state to an activated state. The telephony framework layer 401 sends a command of establishing the data connection to the RIL corresponding to the primary card in the RIL 403, the RIL corresponding to the primary card in the RIL 403 translates the command to a modem instruction of establishing the data connection and sends the modem instruction to the modem corresponding to the primary card in the DSDS modem 404, and the modem corresponding to the primary card in the DSDS modem 404 specifically executes an operation of establishing the data connection.

In the prior art, when a secondary card is used in a call, if a circuit switch (Circuit Switch, CS) domain is used to transmit voice, in this case, because the CS domain exclusively occupies a radio frequency antenna and a packet switch (Packet Switch, PS) domain of the secondary card cannot occupy the radio frequency antenna, the secondary card cannot support a voice service and a data service simultaneously. In a method provided in the embodiments of the present invention, when a terminal performs a data service by using a primary card, if the terminal performs a voice service by using a secondary card, the terminal switches the data service performed by using the primary card to the secondary card, and performs the data service by using the secondary card. Specifically, the telephony framework layer 402 is responsible for clearing a route of the data service of the primary card and sending a command of allowing a data connection and a command of establishing the data connection to the RIL corresponding to the secondary card in the RIL 403. Voice is transmitted by using the PS domain in the VoLTE voice service, and WCDMA supports concurrent transmission of the voice service in the CS domain and the data service in the PS domain. Therefore, the voice service and the data service may be transmitted simultaneously by using the modem corresponding to the secondary card, so that the data service can be transmitted by using the secondary card that is being used in the call. It should be noted that, the function of transmitting the voice service and the data service simultaneously by using the modem corresponding to the secondary card may also be applied to a scenario in which the data service needs to be transmitted when the secondary card is used in a call. This is not limited in this embodiment of the present invention.

The function can be controlled by a switch. Referring to FIG. 3A, FIG. 3B, and FIG. 3C, the terminal may further display an option interface, and content displayed in the option interface is used to indicate whether a function that the internet can be accessed by using the secondary card that is being used in a call is enabled (for example, whether a switch "automatically switch data to the secondary card when the secondary card is used in a call" is turned on). A user may set the switch to control whether the following function is to be enabled: when the secondary card is used to perform the VoLTE voice service or the WCDMA voice service, whether to switch the data service from the primary card to the secondary card. For example, when the switch is turned on, when performing the data service by using the primary card, the terminal automatically switches the data service performed by using the primary card to the secondary card if the secondary card is used in a call. It should be noted that, the function of the switch may either be enabled or disabled by default. Alternatively, an operation on the switch may not be provided in a display interface, and the function of the switch may be fixed in a program as enabled or disabled by default. Alternatively, the switch and the default mobile data option may not be displayed in a same interface. The "automatically switch data to the secondary card when the secondary card is used in a call" is merely a possible form of the function in the display interface, and may also be referred to as names such as "the internet can be accessed by using the secondary card that is being used in a call", which may be generally referred to as "the internet can be accessed during a call" in the embodiments of the present invention.

Figure 5:
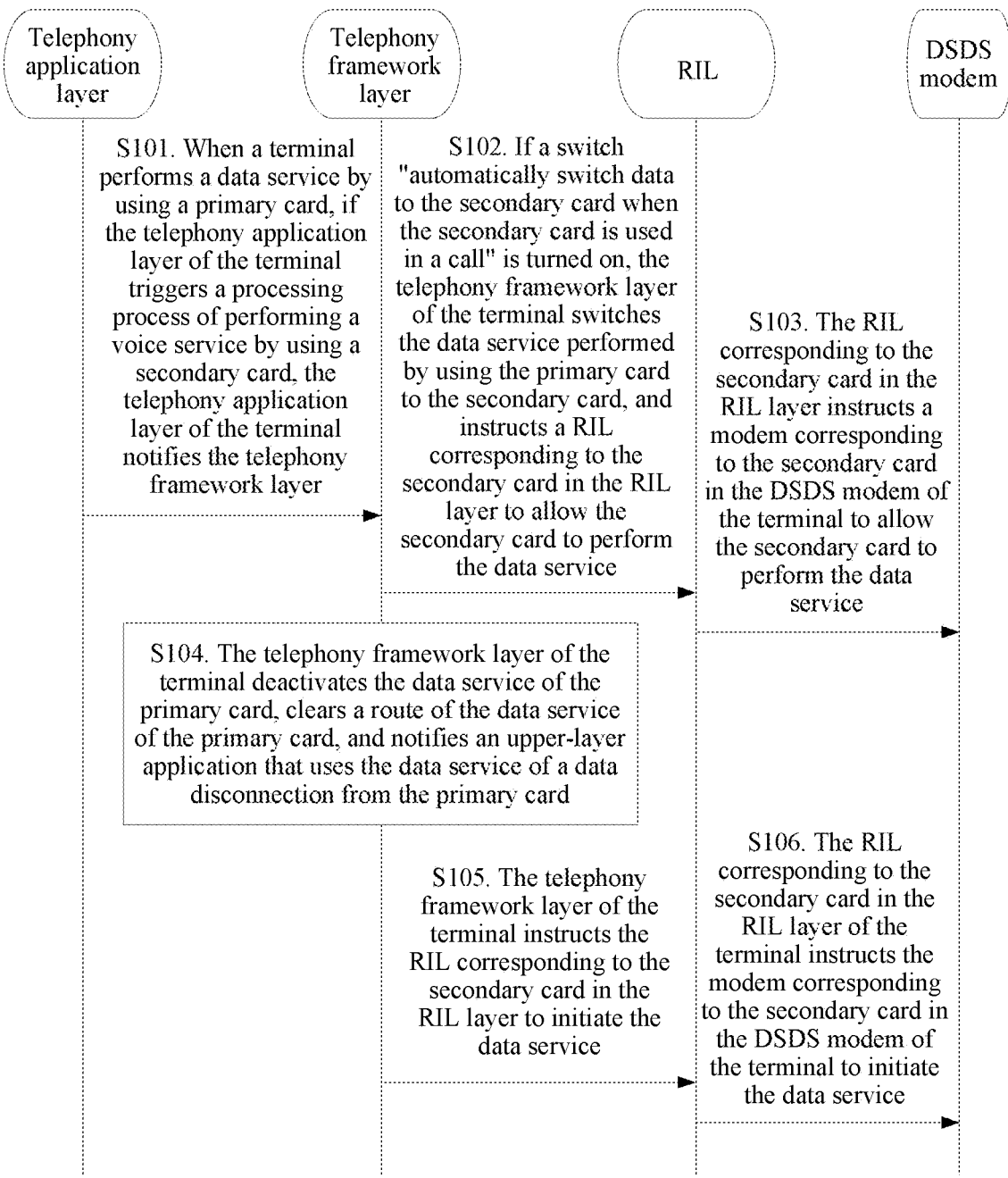
FIG. 5 is a schematic flowchart 1 of a method for supporting a voice service and a data service simultaneously according to an embodiment of the present invention.

Specifically, an embodiment of the present invention provides a method for supporting a voice service and a data service simultaneously, which can be applied to the foregoing terminal. Referring to FIG. 5, the method includes S101 to S106.

S101: When the terminal performs a data service by using a primary card, if a telephony application layer of the terminal triggers a processing process of performing a voice service by using a secondary card, the telephony application layer of the terminal notifies a telephony framework layer.

An application in the telephony application layer may register for listening to a ringing event. When detecting an incoming call, a modem corresponding to the secondary card in a DSDS modem broadcasts the ringing event to the telephony application layer by using a RIL layer and the telephony framework layer. In this case, a user can accept or reject the call on the secondary card by using an incoming call screen in the telephony application layer.

When the user makes a call in a dial interface in the telephony application layer by using the secondary card, or when the user accepts a call on the secondary card in the incoming call screen in the telephony application layer, the telephony application layer triggers a processing process of performing a VoLTE voice service or a WCDMA voice service by using the secondary card.

Figure 6:
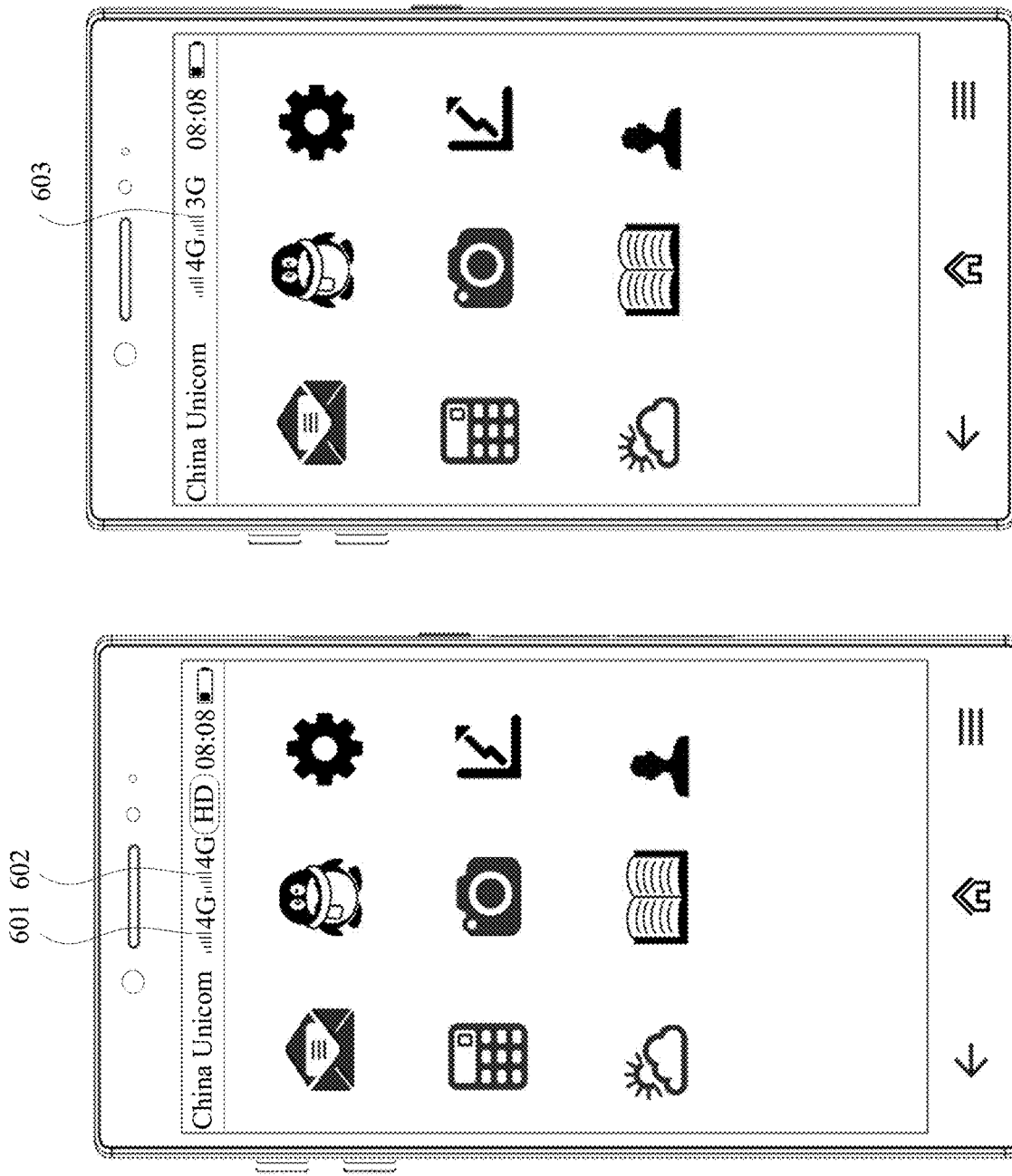
FIG. 6 is a schematic diagram of supporting VoLTE or WCDMA by a terminal according to an embodiment of the present invention.

For example, FIG. 6 is a schematic diagram of supporting VoLTE or WCDMA by a terminal. A primary card 601 may be of 4G LTE, and a secondary card 602 may be of 4G LTE that supports VoLTE. HD is usually used to indicate transmission of high-definition voice. Alternatively, a secondary card 603 may be of 3G WCDMA.

The telephony application layer of the terminal notifies the telephony framework layer that when the terminal performs the data service by using the primary card, the VoLTE voice service or the WCDMA voice service needs to be performed by using the secondary card. In a specific manner of notifying the telephony framework layer, the telephony application layer may access a telephony interface management service corresponding to the secondary card.

S102: If a switch "automatically switch data to the secondary card when the secondary card is used in a call" is turned on, the telephony framework layer of the terminal switches the data service performed by using the primary card to the secondary card, and instructs a RIL corresponding to the secondary card in a RIL layer to allow the secondary card to perform the data service.

Specifically, whether the switch is turned on may be determined based on a switch state of the switch "automatically switch data to the secondary card when the secondary card is used in a call" in a dual SIM management option interface.

Figure 7:
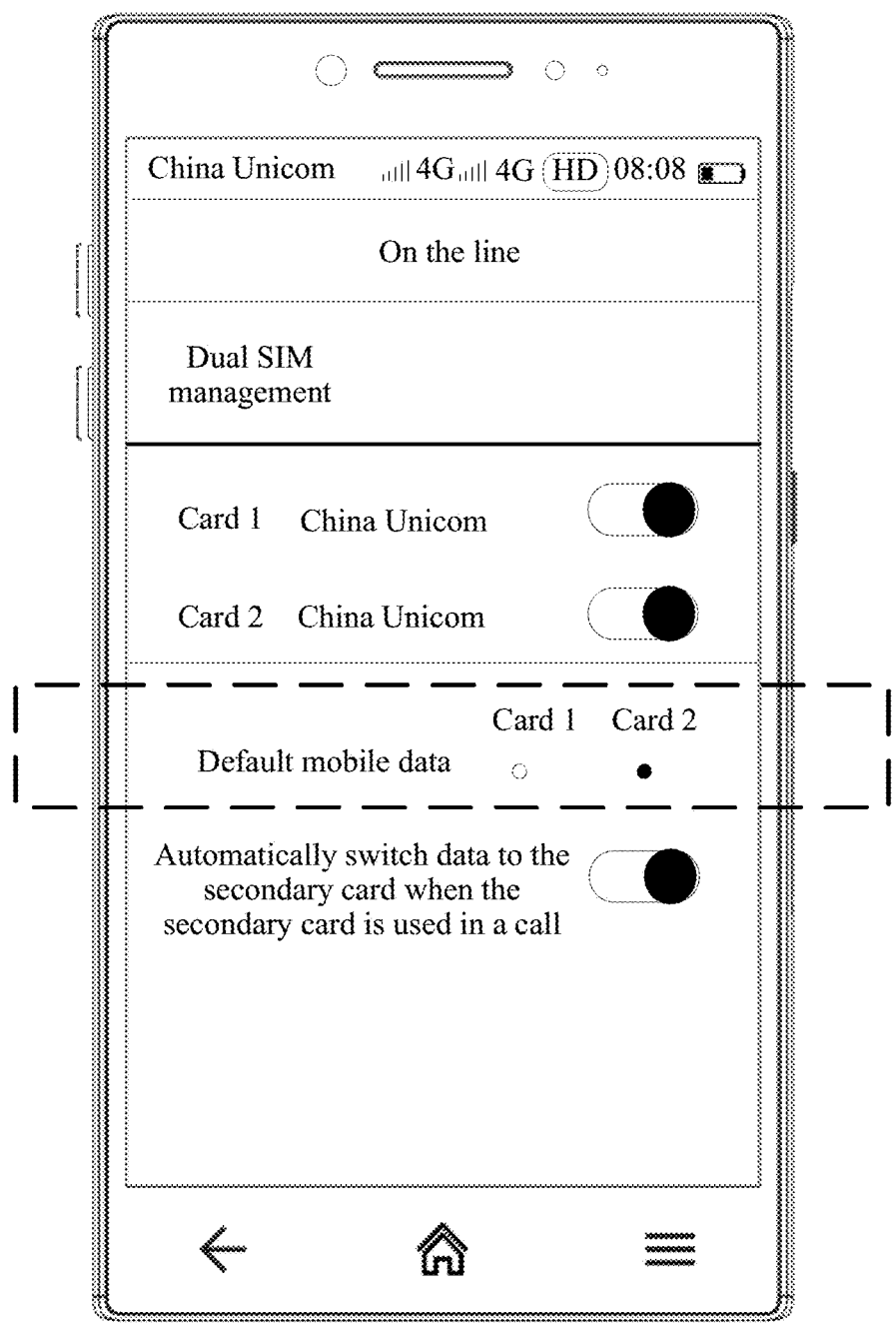
FIG. 7 is a schematic diagram 2 of a display interface according to an embodiment of the present invention.
Figure 8:
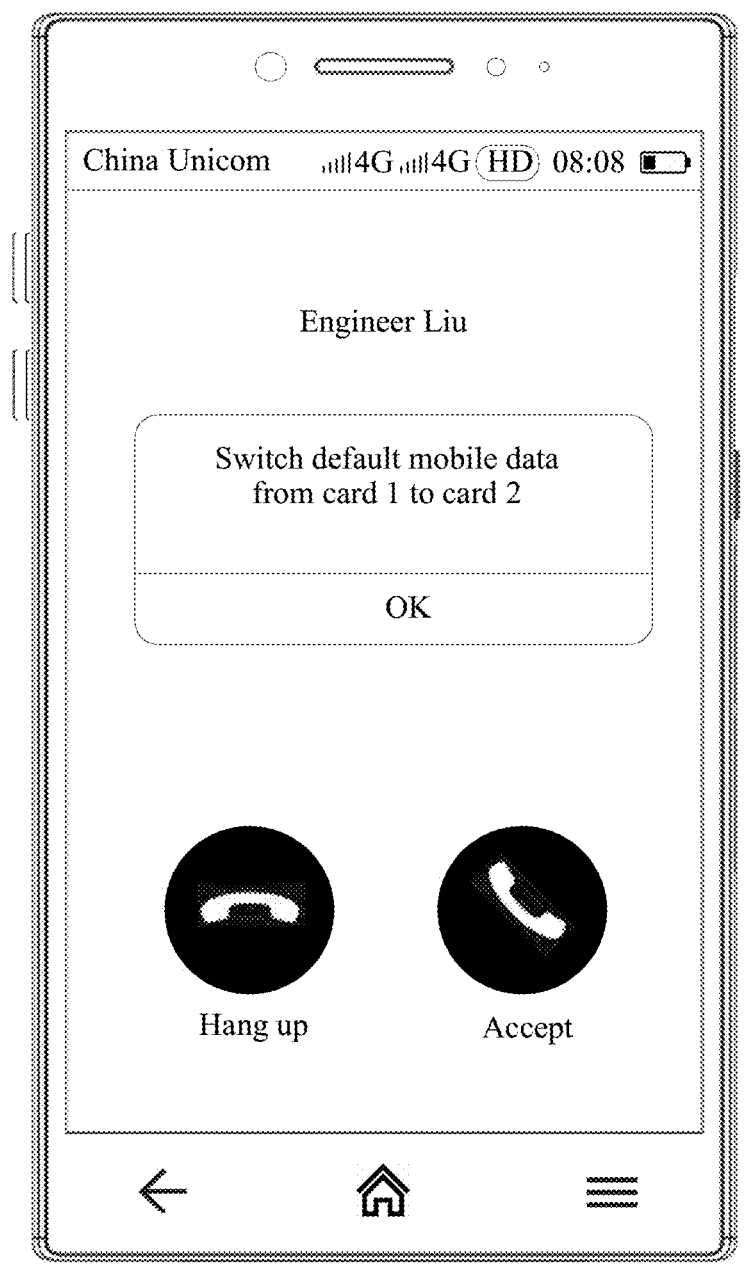
FIG. 8 is a schematic diagram 3 of a display interface according to an embodiment of the present invention.

Optionally, content may be displayed in a dual SIM management option interface shown in FIG. 7 to indicate that default mobile data is switched from the primary card (for example, a card 1) to the secondary card (for example, a card 2) when the voice service is performed by using the secondary card. Optionally, referring to FIG. 8, the terminal may alternatively display prompt information on a display screen, and the prompt information is used to indicate that default mobile data is switched from the primary card (for example, a card 1) to the secondary card (for example, a card 2) when the voice service is performed by using the secondary card.

The telephony framework layer of the terminal may send an instruction of allowing the data service (for example, a value of RIL_REQUEST_ALLOW_DATA is set to true (TRUE)) to the RIL corresponding to the secondary card in the RIL layer, to instruct the RIL corresponding to the secondary card in the RIL layer to allow the secondary card to perform the data service.

It should be noted that, in this case, the telephony framework layer of the terminal may not need to send an instruction of forbidding the data service (for example, the value of RIL_REQUEST_ALLOW_DATA is set to false (FALSE)) to a RIL corresponding to the primary card in the RIL layer, to instruct the RIL corresponding to the primary card in the RIL layer to forbid the primary card to perform the data service. This is because the secondary card occupies a radio frequency resource in this case, and the instruction cannot be sent to the DSDS modem by using the ML. Therefore, the telephony framework layer may not send the instruction but directly return a "sent successfully" response in a function of sending the instruction.

Figure 9A:
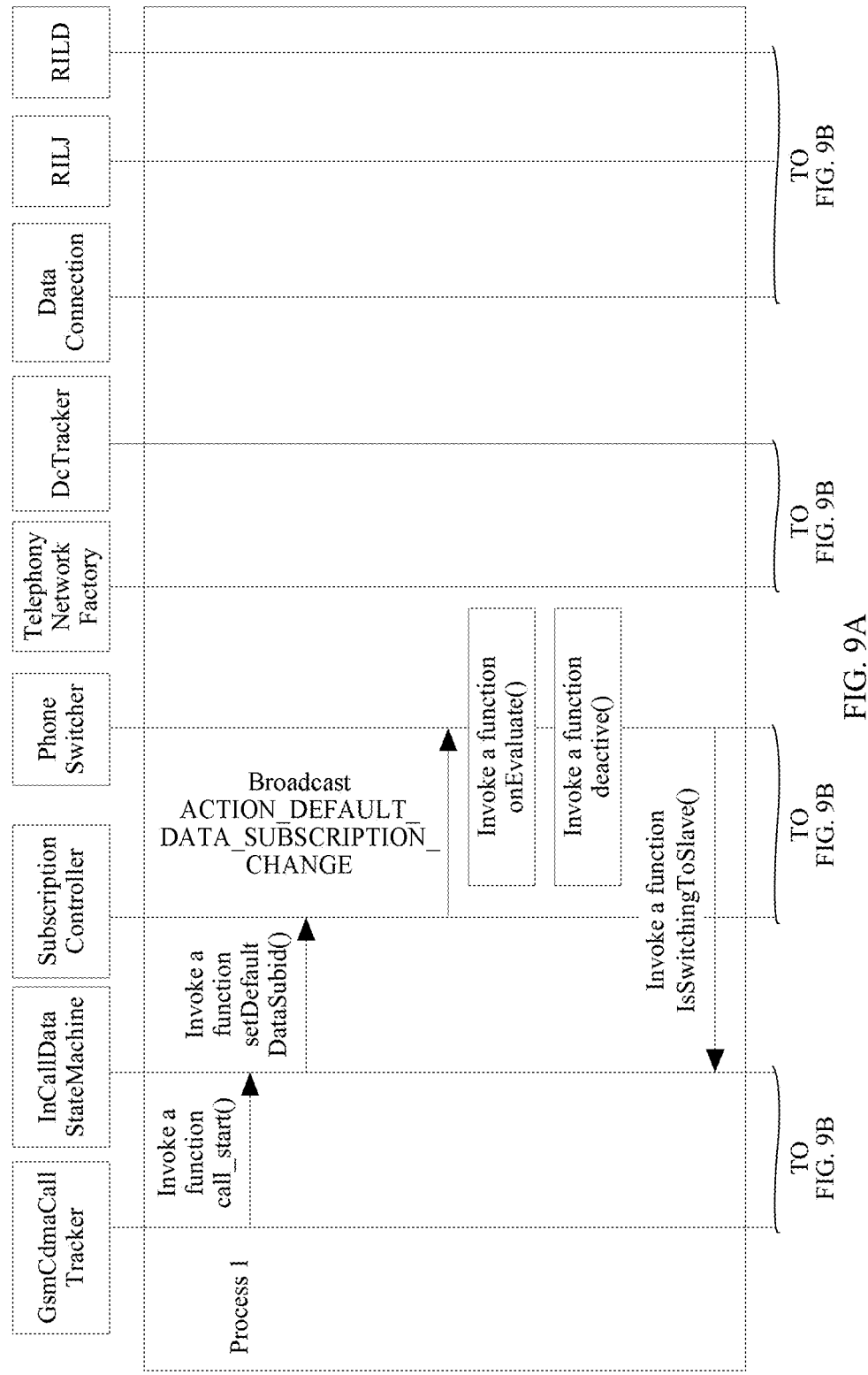
FIG. 9A, FIG. 9B, and FIG. 9C are a schematic flowchart 1 of communication between objects in a telephony framework layer and a RIL according to an embodiment of the present invention.
Figure 9B:
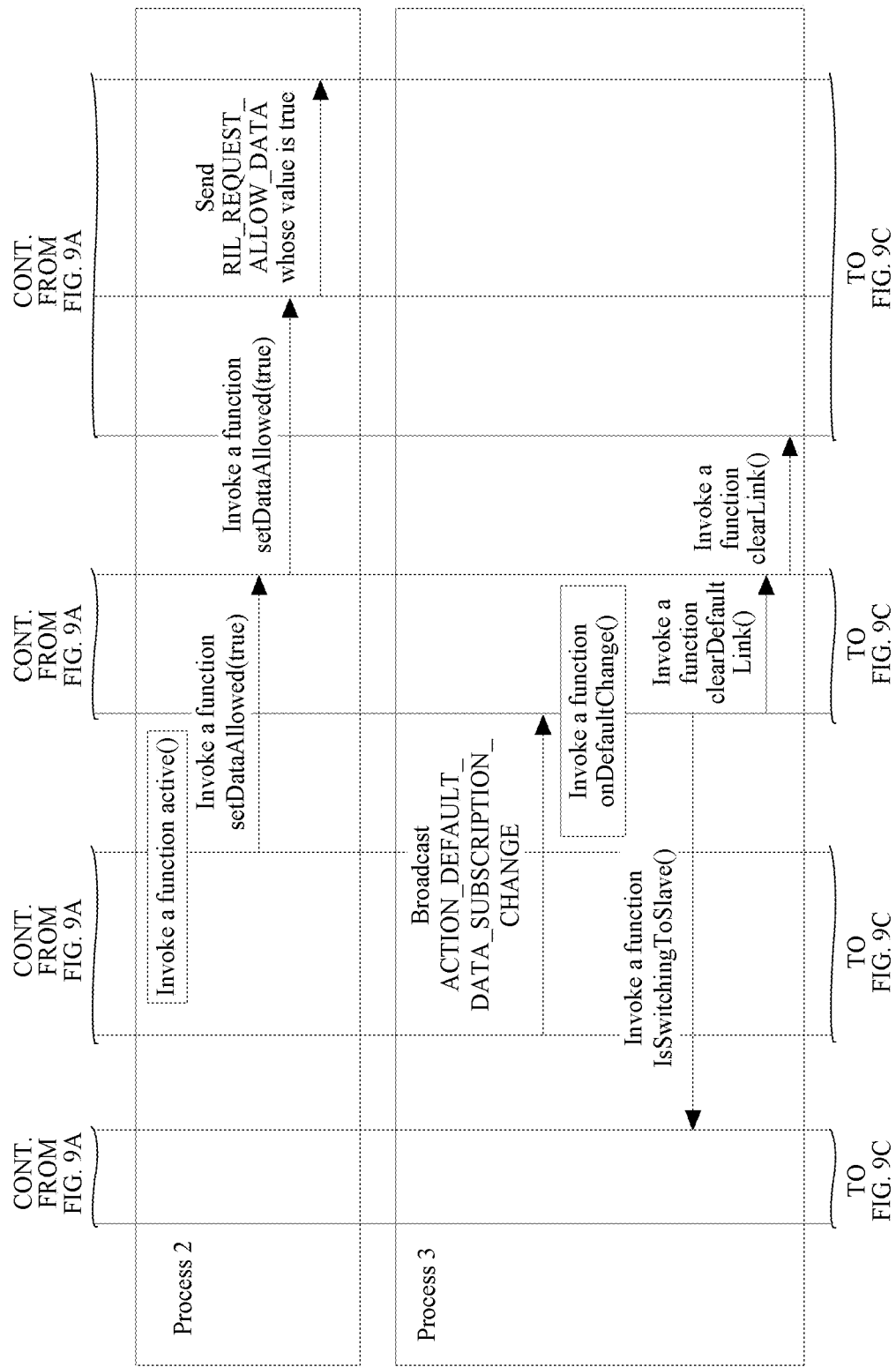
Figure 9C:
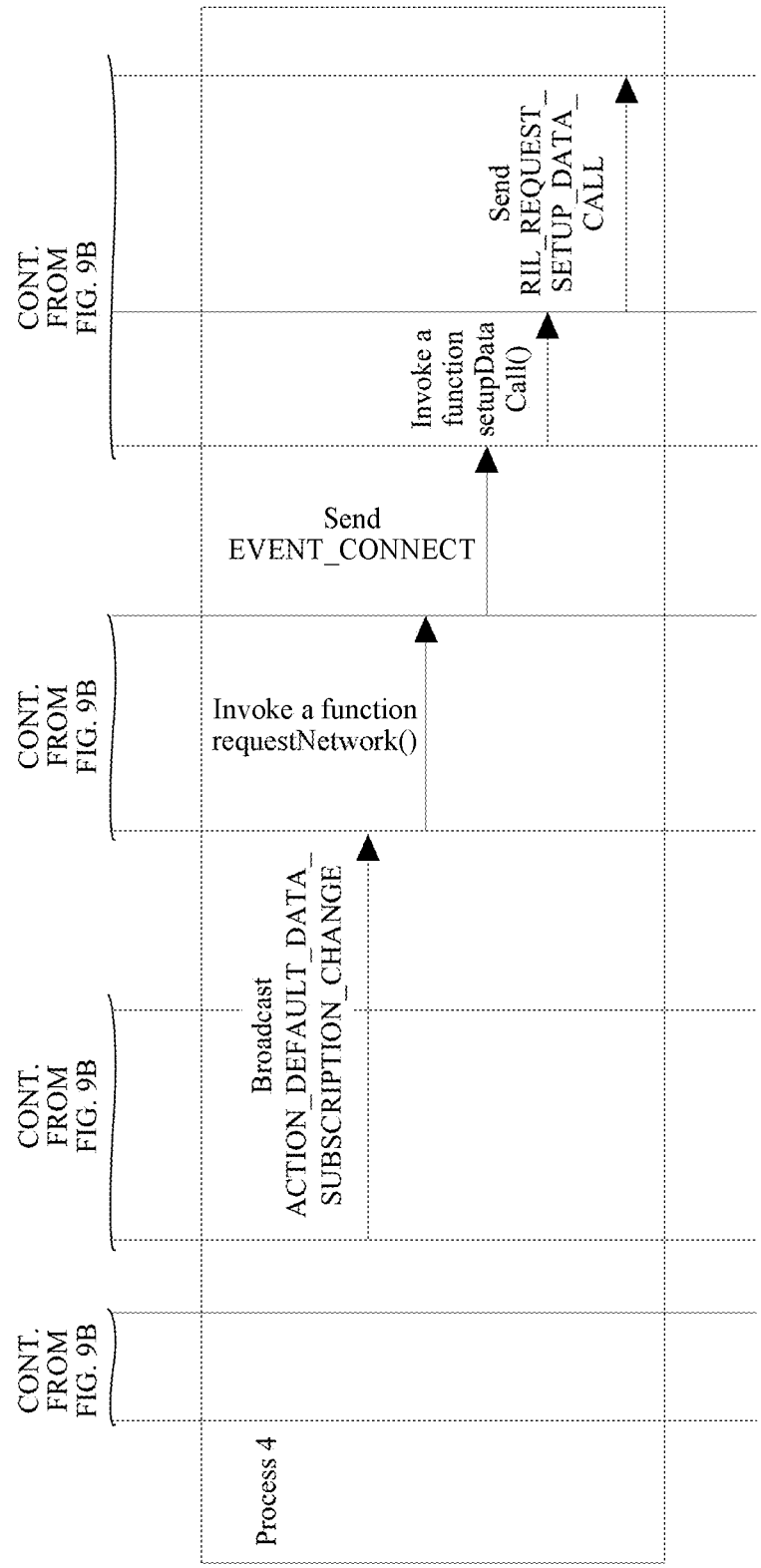

Based on an Android 8.0 version, FIG. 9A, FIG. 9B, and FIG. 9C are a schematic flowchart of communication between objects in a telephony framework layer and a RIL according to an embodiment of the present invention. An object GsmCdmaCallTracker is configured to provide call (CALL) management in a GSM mode and a CDMA mode. An object InCallDataStateMachine is configured to provide in-call state machine management. An object SubscriptionController is configured to obtain SIM card information. An object PhoneSwitcher is configured to listen to a change of data. An object TelephonyNetworkFactory is configured to listen to switching of the data. An object DcTracker is configured to manage connection, disconnection, and the like of a data service in the telephony framework layer. An object DataConnection is also configured to manage connection, disconnection, and the like of the data service in the telephony framework layer. RILJ and RILD mentioned above belong to the RIL, while all other objects are in the telephony framework layer. For a specific communication process, refer to a process 1 and a process 2 in FIG. 9A, FIG. 9B, and FIG. 9C.

Process 1: The object GsmCdmaCallTracker invokes a function call_start( ) to trigger the voice service to be performed by using the secondary card. The object InCallDataStateMachine invokes a function setDefaultDataSubid( ) to set that the default mobile data is switched from the primary card to the secondary card. The object SubscriptionController broadcasts an instruction ACTION_DEFAULT_DATA_SUBSCRIPTION_CHANGE to instruct to set the default mobile data to be switched from the primary card to the secondary card. After receiving the broadcast, the object PhoneSwitcher invokes a function onEvaluate( ) to evaluate whether the secondary card meets a data service condition, invokes a function deactive( ) to deactivate the data service of the primary card, and invokes a function IsSwitchingToSlave( ) to indicate that setting for switching the default mobile data from the primary card to the secondary card is completed. In this process, the setting for switching the default mobile data from the primary card to the secondary card is implemented.

Process 2: The object PhoneSwitcher invokes a function active( ) to activate the data service of the secondary card, and invokes a function setDataAllowed(true) to allow the secondary card to perform the data service. The object DcTracker invokes the function setDataAllowed(true) to allow the secondary card to perform the data service. A RILJ client corresponding to the secondary card sends an instruction RIL_REQUEST_ALLOW_DATA whose value is true (TRUE) to a RIL server corresponding to the secondary card, to instruct the RIL corresponding to the secondary card in the RIL layer to allow the secondary card to perform the data service. In this process, the telephony framework layer instructs the RIL corresponding to the secondary card in the RIL layer to allow the secondary card to perform the data service.

S103: The RIL corresponding to the secondary card in the RIL layer instructs a modem corresponding to the secondary card in a DSDS modem of the terminal to allow the secondary card to perform the data service.

Specifically, the RIL corresponding to the secondary card in the RIL layer sends a modem instruction of allowing the secondary card to perform the data service to the modem corresponding to the secondary card in the DSDS modem.

S104: The telephony framework layer of the terminal deactivates the data service of the primary card, clears a route of the data service of the primary card, and notifies an upper-layer application that uses the data service of a data disconnection from the primary card.

Usually, the data service of the primary card is deactivated by the object DcTracker in the telephony framework layer by sending an instruction of deactivating the data service (for example, RIL_REQUEST_DEACTIVE_DATA_CALL) to a RIL corresponding to the primary card. However, because the secondary card occupies a radio frequency resource in this case, the object DcTracker cannot send the instruction to the DSDS modem by using the ML. Therefore, the object DcTracker may directly deactivate the data service of the primary card, and the telephony framework layer may not send the instruction but directly return a "sent successfully" response in a function of sending the instruction.

A method of creating a clearing route (for example, clearLink) in a data connection (DataConnection) object in the telephony framework layer may be used to clear the route of the data service of the primary card. The route of the data service is stored in the telephony framework layer.

All upper-layer applications that use the data service (which include an application in the telephony application layer and another application, for example, WeChat) can register for listening to a data connection status. If a data connection state changes, the upper-layer applications that register for listening to the data connection status may be notified by a broadcast.

For a specific communication process, refer to a process 3 in FIG. 9A, FIG. 9B, and FIG. 9C.

Process 3: After receiving an instruction ACTION_DEFAULT_DATA_SUBSCRIPTION_CHANGE broadcast by the object SubscriptionController, the object TelephonyNetworkFactory invokes a function onDefaultChange( ) to process switching of the mobile data, and invokes the function IsSwitchingToSlave( ) to indicate that the default mobile data is switched from the primary card to the secondary card, and invokes a function clearDefaultLink( ) to clear the route of the data service of the primary card. The object DcTracker invokes a newly created function clearLink( ) to clear the route of the data service of the primary card.

S105: The telephony framework layer of the terminal instructs the RIL corresponding to the secondary card in the RIL layer to initiate the data service.

Specifically, the telephony framework layer of the terminal may send an instruction of initiating the data service (for example, RIL_REQUEST_SETUP_DATA_CALL) to the RIL corresponding to the secondary card, to initiate the data service.

For details, refer to a process 4 in FIG. 9A, FIG. 9B, and FIG. 9C.

Process 4: After receiving the instruction ACTION_DEFAULT_DATA_SUBSCRIPTION_CHANGE broadcast by the object SubscriptionController, the object TelephonyNetworkFactory invokes a function requestNetwork( ) to request to establish a data connection to the secondary card. The object DcTracker sends an instruction EVENT CONNECT to the object DataConnection to indicate that a data connection establishment event occurs. The object DataConnection invokes a function setupDataCall( ) to instruct to establish the data connection. The RILJ client sends an instruction RIL_REQUEST_SETUP_DATA_CALL to the RILD server end to instruct to establish the data connection and initiate the data service.

S106: The RIL corresponding to the secondary card in the RIL layer of the terminal instructs the modem corresponding to the secondary card in the DSDS modem of the terminal to initiate the data service.

Specifically, the RIL corresponding to the secondary card in the RIL layer sends a modem instruction of allowing the data connection to be established to the modem corresponding to the secondary card in the DSDS modem.

Figure 10A:
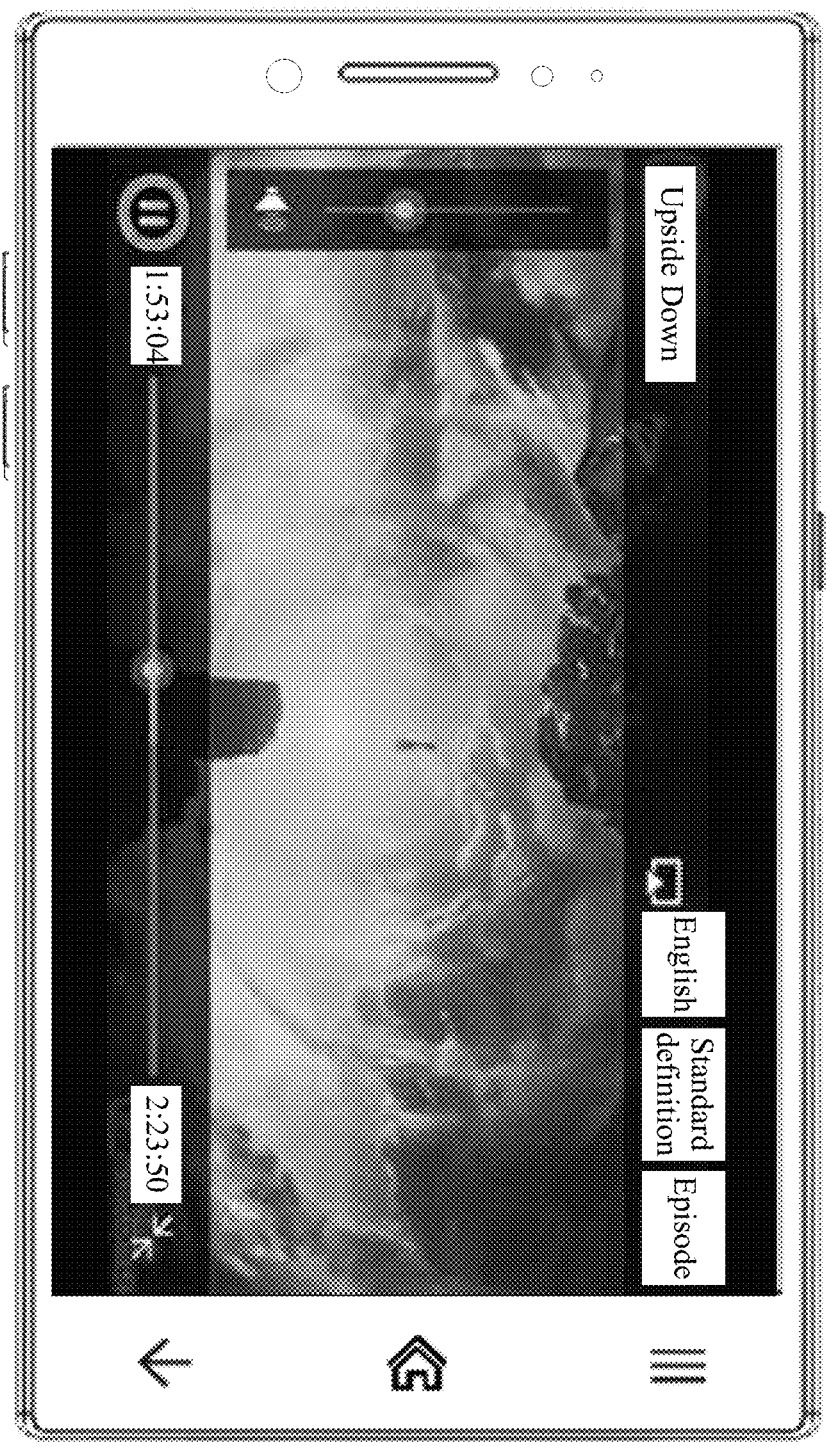
FIG. 10A, FIG. 10B, and FIG. 10C are a schematic diagram of performing a data service and making a call by using a secondary card according to an embodiment of the present invention.
Figure 10B:
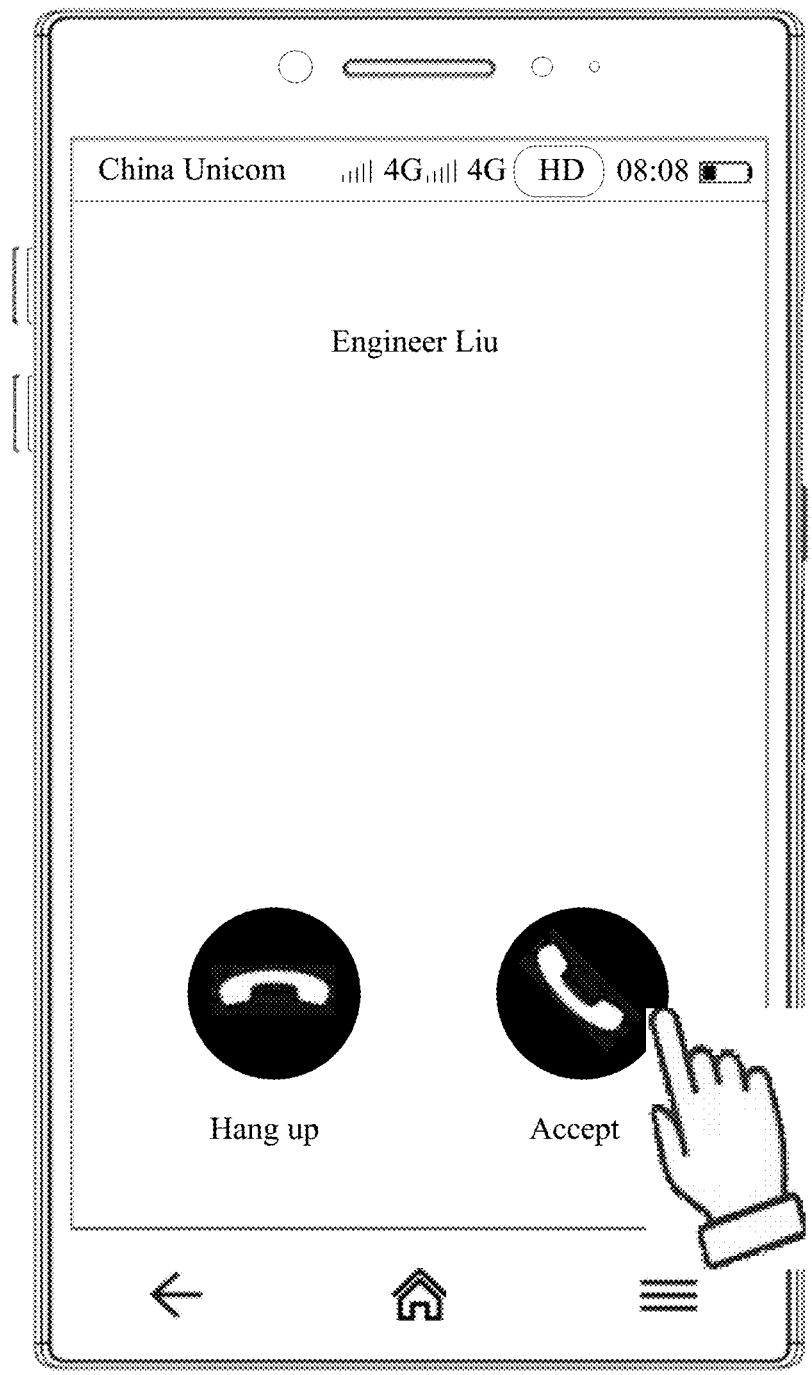
Figure 10C:
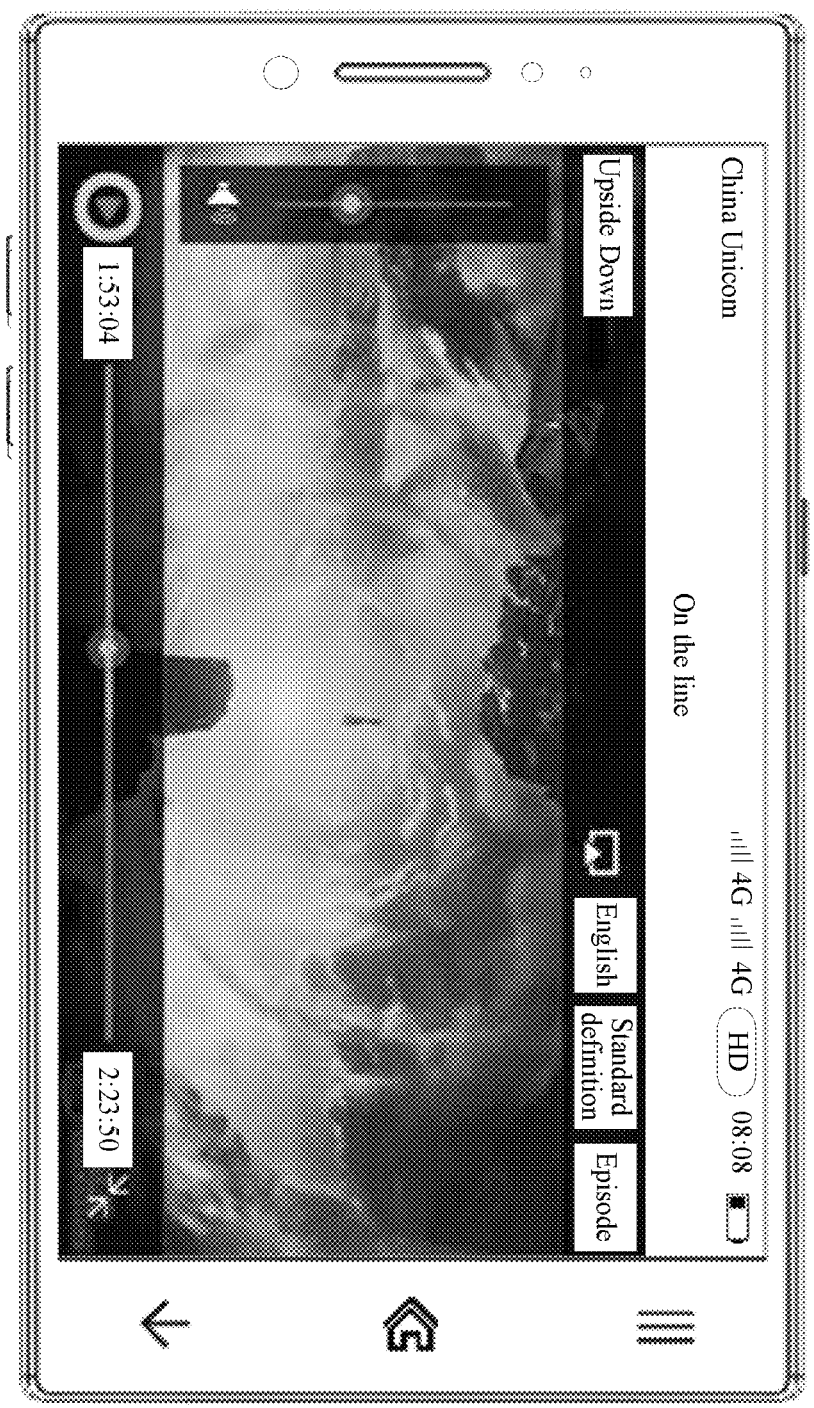

After the foregoing steps are performed, the data service can be transmitted by using the secondary card that is being used in the call. This is illustrated as follows: For example, the secondary card supports the VoLTE voice service, FIG. 10A shows that a user is watching a video by using the primary card, FIG. 10B shows that the secondary card has an incoming VoLTE call at this time, and the VoLTE voice service is performed by using the secondary card, and FIG. 10C shows that the user can continue to watch the video when the secondary card is used in the call.

In the method for supporting a voice service and a data service simultaneously provided in this embodiment of the present invention, although by default, the dual SIM dual standby single pass phone can perform the data service only by using the primary card, when the VoLTE voice service or the WCDMA voice service is performed by using the secondary card, the voice service and the data service may be transmitted simultaneously by using the modem corresponding to the secondary card. In this way, when the dual SIM dual standby single pass phone performs the data service by using the primary card, if the secondary card is used in a call, the data service is migrated to the secondary card, so that the data service can be transmitted by using the secondary card that is being used in the call.

When the terminal performs the data service and the voice service simultaneously by using the secondary card, if the terminal ends the voice service performed by using the secondary card, the terminal switches the data service performed by using the secondary card to the primary card, and performs the data service by using the primary card, to ensure that transmission of the data service can be continued. Optionally, referring to FIG. 11, the method may further include S201 to S206.

S201: When the terminal performs the data service and the voice service simultaneously by using the secondary card, if the terminal ends the voice service performed by using the secondary card, the telephony application layer of the terminal triggers a processing process of ending the voice service performed by using the secondary card, and notifies the telephony framework layer.

The application in the telephony application layer may register for listening to a call state change event. When detecting that the other party hangs up the call, the modem corresponding to the secondary card in the DSDS modem broadcasts the call state change event to the telephony application layer by using the RIL layer and the telephony framework layer, and the telephony application layer proactively obtains a call state change cause from the DSDS modem. The call state change cause may be normal hanging up.

When the user hangs up the call on the secondary card in a call screen in the telephony application layer, or when the telephony application layer learns that the call state change cause is normal hanging up, the telephony application layer triggers a processing process of ending the VoLTE voice service or the WCDMA voice service performed by using the secondary card.

S202: The telephony framework layer of the terminal switches the default mobile data from the secondary card to the primary card, and instructs the RIL corresponding to the secondary card in the RIL layer to forbid the secondary card to perform the data service.

Specifically, the telephony framework layer of the terminal may send an instruction of forbidding the data service (for example, a value of RIL_REQUEST_ALLOW_DATA is set to false (FALSE)) to the RIL corresponding to the secondary card, to instruct the RIL corresponding to the secondary card in the RIL layer to forbid the secondary card to perform the data service.

Figure 12:
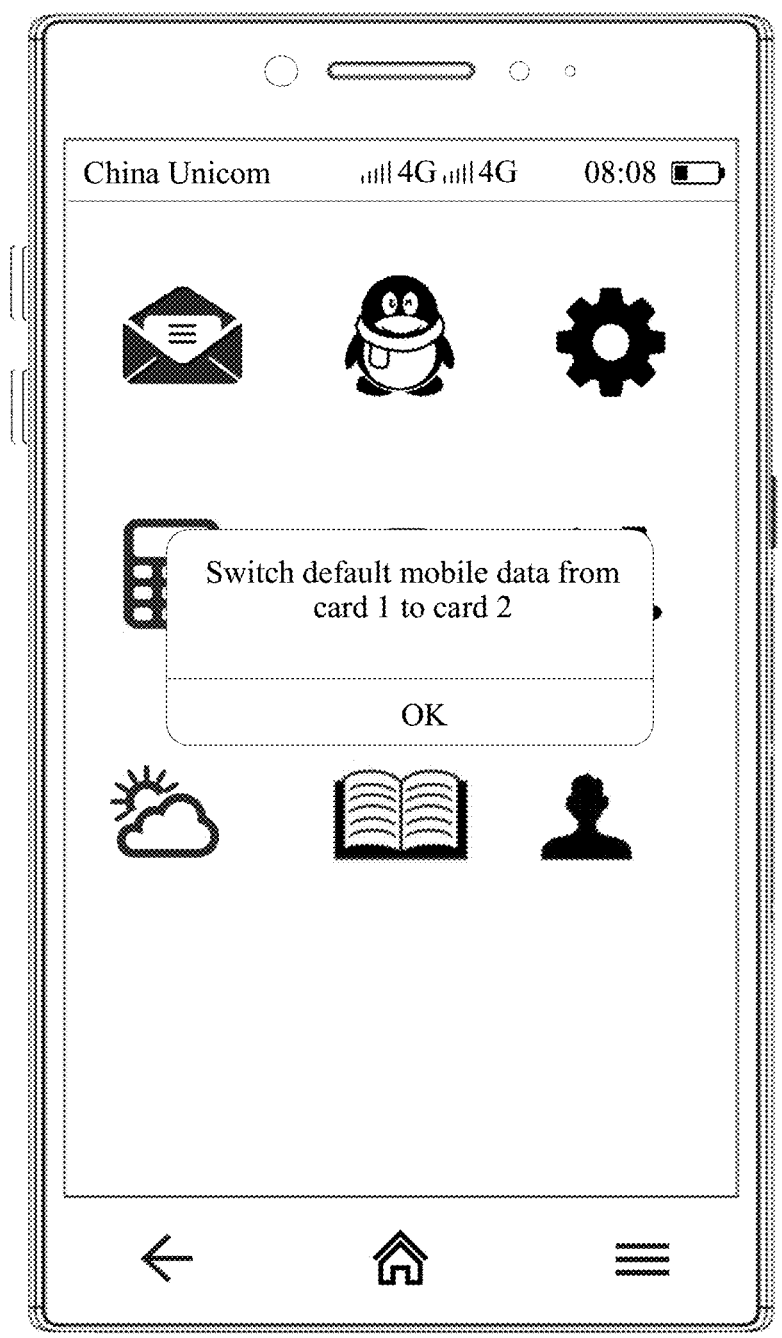
FIG. 12 is a schematic diagram 4 of a display interface according to an embodiment of the present invention.

Optionally, content may be displayed in the dual SIM management option interface shown in FIG. 3A, FIG. 3B, and FIG. 3C to indicate that the default mobile data is switched from the secondary card to the primary card after the voice service performed by using the secondary card ends. Optionally, referring to FIG. 12, the terminal may alternatively display prompt information on a display screen, and the prompt information is used to indicate that the default mobile data is switched from the secondary card to the primary card after the voice service performed by using the secondary card ends.

Figure 13A:
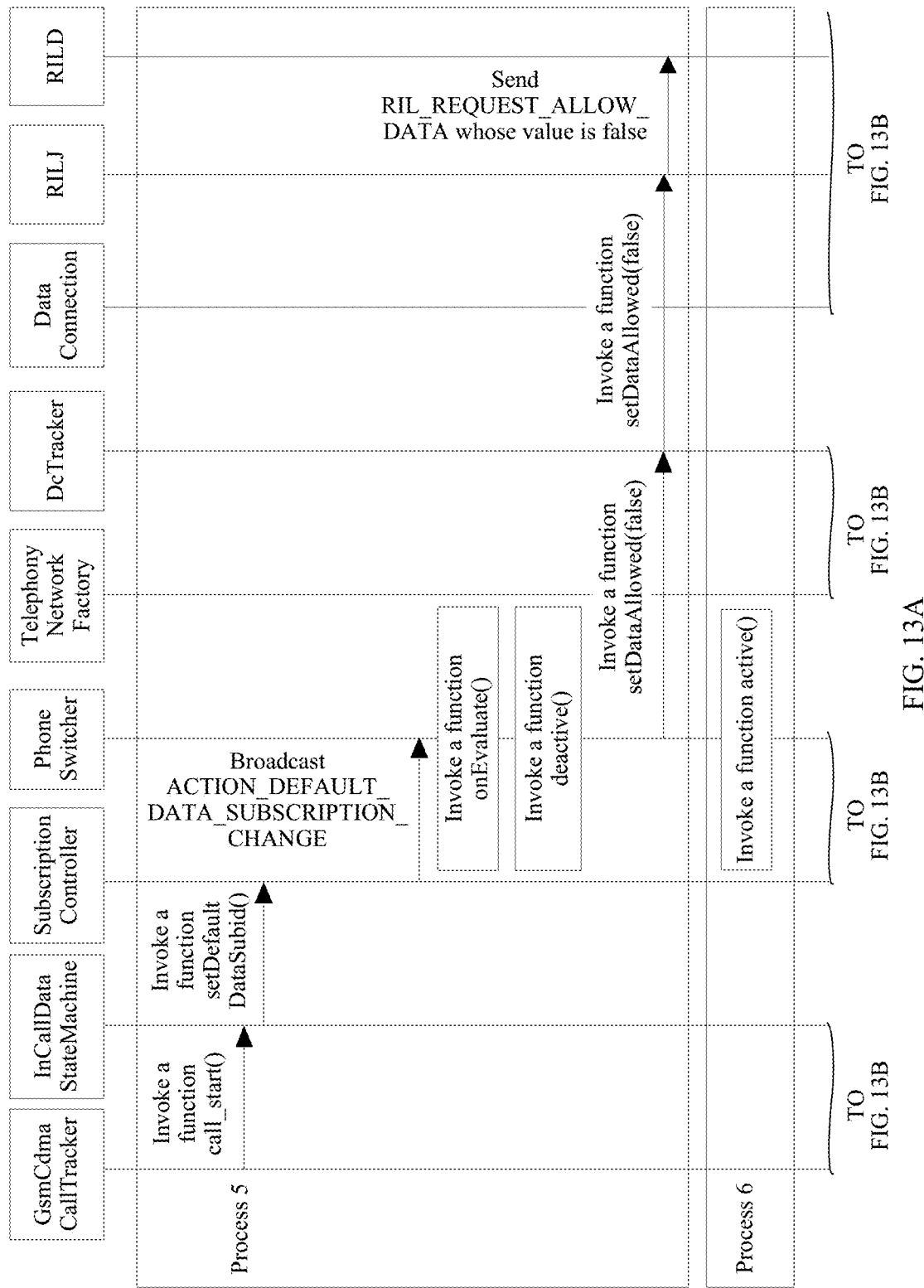
FIG. 13A and FIG. 13B are a schematic flowchart 2 of communication between objects in a telephony framework layer and a RIL according to an embodiment of the present invention.
Figure 13B:
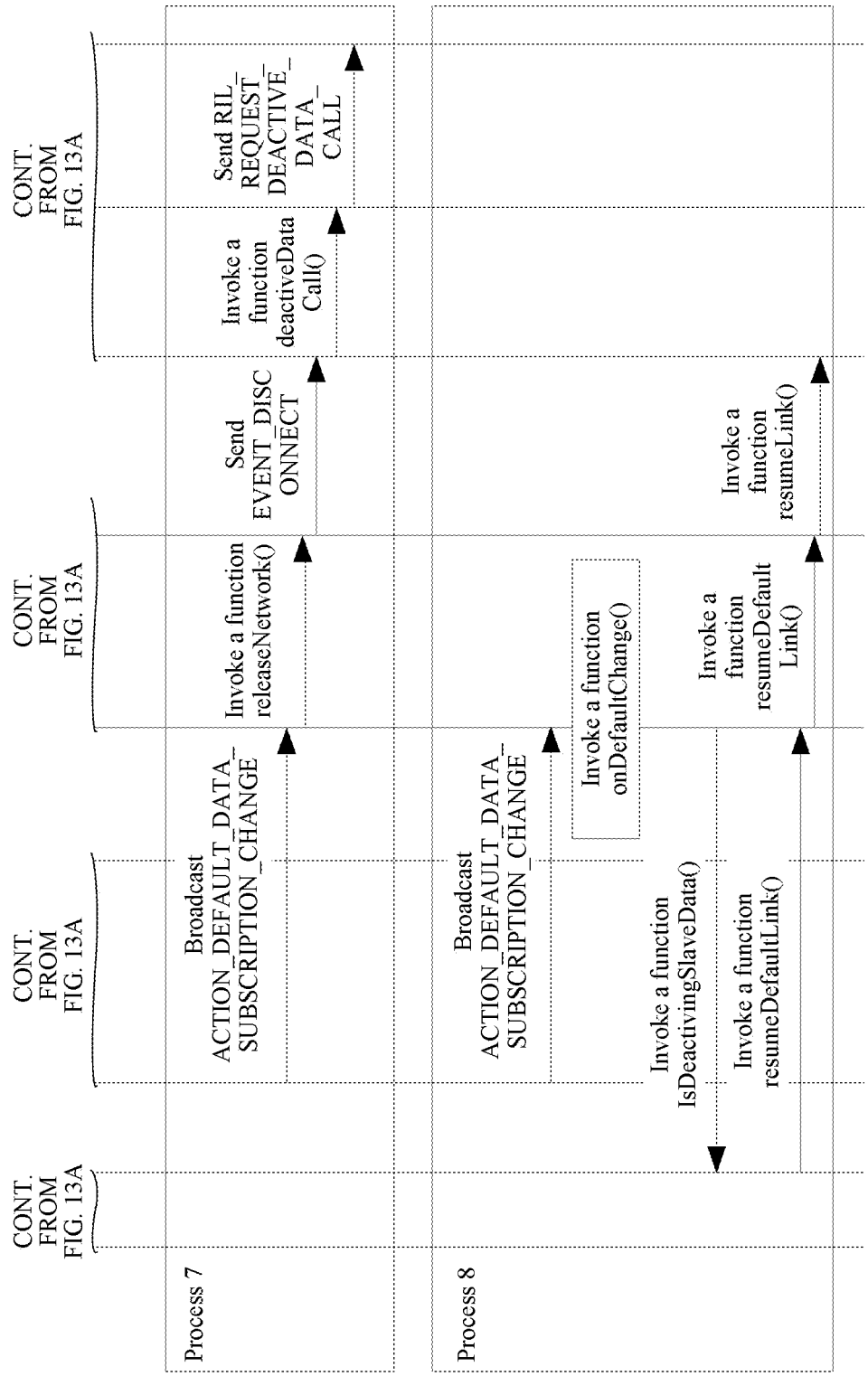

FIG. 13A and FIG. 13B are another schematic flowchart of communication between a telephony framework layer and a RIL according to an embodiment of the present invention. For details of this step, refer to a process 5 and a process 6 in FIG. 13A and FIG. 13B.

Process 5: The object GsmCdmaCallTracker invokes a function call_end( ) to trigger the voice service performed by using the secondary card to be ended. The object InCallDataStateMachine invokes a function setDefaultDataSubid( ) to set that the default mobile data is switched from the secondary card to the primary card. The object SubscriptionController broadcasts an instruction ACTION_DEFAULT_DATA_SUBSCRIPTION_CHANGE to instruct to switch the default mobile data from the secondary card to the primary card. After receiving the broadcast, the object PhoneSwitcher invokes the function onEvaluate( ) to evaluate whether the primary card meets a data service condition. The object PhoneSwitcher invokes the function deactive( ) to deactivate the data service of the secondary card. The object PhoneSwitcher invokes a function setDataAllowed (false) to forbid the secondary card to perform the data service. The object DcTracker invokes the function setDataAllowed(false) to forbid the secondary card to perform the data service. The RILJ client corresponding to the secondary card sends an instruction RIL_REQUEST_ALLOW_DATA whose value is false (FALSE) to the RIL server corresponding to the secondary card, to instruct the RIL corresponding to the secondary card in the RIL layer to forbid the secondary card to perform the data service.

Process 6: The object PhoneSwitcher invokes the function active( ) to activate the data service of the primary card. Different from the process 2 shown in FIG. 9A, FIG. 9B, and FIG. 9C, when the data service is switched from the primary card to the secondary card, the primary card is not forbidden to perform the data service. Therefore, in response to a processing function (for example, onDefaultChange) of switching the data service from the secondary card back to the primary card, an instruction of allowing the data service to be performed does not need to be sent to the RIL corresponding to the primary card (for example, RIL_REQUEST_ALLOW_DATA whose value is true (TRUE) does not need to be sent.) Additionally, because the data service of the primary card is reactivated, the telephony framework layer of the terminal does not need to send an instruction of initiating the data service (for example, RIL_REQUEST_

SETUP_DATA_CALL does not need to be sent) to the RIL corresponding to the primary card, to initiate the data service.

S203: The RIL corresponding to the secondary card in the RIL layer instructs the modem corresponding to the secondary card in the DSDS modem of the terminal to forbid the secondary card to perform the data service.

Specifically, the RIL corresponding to the secondary card in the RIL layer sends a modem instruction of forbidding the secondary card to perform the data service to the modem corresponding to the secondary card in the DSDS modem.

S204: The telephony framework layer of the terminal instructs the RIL corresponding to the secondary card in the RIL layer to deactivate the data service of the secondary card.

Specifically, the telephony framework layer of the terminal may send an instruction of deactivating the data service (for example, RIL_REQUEST_DEACTIVE_DATA_CALL) to the RIL corresponding to the secondary card in the RIL layer, to deactivate the data service of the secondary card.

For details, refer to a process 7 in FIG. 13A and FIG. 13B:

Process 7: After receiving the instruction ACTION_DEFAULT_DATA_SUBSCRIPTION_CHANGE broadcast by the object SubscriptionController, the object TelephonyNetworkFactory invokes a function releaseNetwork( ) to request to release a data connection to the secondary card. The object DcTracker sends an instruction EVENT DISCONNECT to the object DataConnection to indicate that a data connection release event occurs. The object DataConnection invokes a function deactiveDataCall( ) to instruct to deactivate the data service. The RILJ client sends an instruction RIL_REQUEST_DEACTIVE_DATA_CALL to the RILD server end to instruct to deactivate the data connection and deactivate the data service.

Additionally, the telephony framework layer of the terminal clears a route of the data service of the secondary card. Specifically, the object DcTracker sends a newly created function clearLink( ) to the object DataConnection, to clear the route of the data service of the secondary card. This is similar to that described in step S104.

S205: The RIL corresponding to the secondary card in the RIL layer of the terminal instructs the modem corresponding to the secondary card in the DSDS modem of the terminal to deactivate the data service of the secondary card.

Specifically, the RIL corresponding to the secondary card in the RIL layer sends a modem instruction of deactivating the data service to the modem corresponding to the secondary card in the DSDS modem.

S206: The telephony framework layer of the terminal resumes the data service by using the primary card, and notifies the upper-layer application that uses the data service that the data connection to the primary card is resumed.

For details, refer to a process 8 in FIG. 13A and FIG. 13B:

Process 8: After receiving the instruction ACTION_DEFAULT_DATA_SUBSCRIPTION_CHANGE broadcast by the object SubscriptionController, the object TelephonyNetworkFactory invokes the function onDefaultChange( ) to process switching of the data. The object TelephonyNetworkFactory directly invokes a function IsDeactivingSlaveData( ) from the object InCallDataStateMachine, to instruct to deactivate the data service of the secondary card. The object InCallDataStateMachine invokes a function resumeDefaultLink( ) to resume the data connection to the primary card. The object TelephonyNetworkFactory invokes a function resumeDefaultLink( ) to resume the data connection to the primary card. The object DcTracker invokes the function resumeLink( ) to resume the data connection to the primary card. The object DataConnection is further responsible for resuming the data route of the primary card.

Additionally, the object DataConnection determines that the data of the primary card is reactivated, and therefore RLS_REQUEST_SETUP_DATA_CALL is not sent to the RILJ client to initiate the data service.

This implementation can ensure that after a call on the secondary card ends, the data service is automatically switched back to the primary card, to ensure that the data service can continue to be used.

An embodiment of the present invention provides a terminal, configured to perform the foregoing method. In this embodiment of the present invention, the terminal device may be divided into function modules based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in this embodiment of the present invention, module division is an example, and is merely logical function division. In actual implementation, another division manner may be used.

Figure 11:
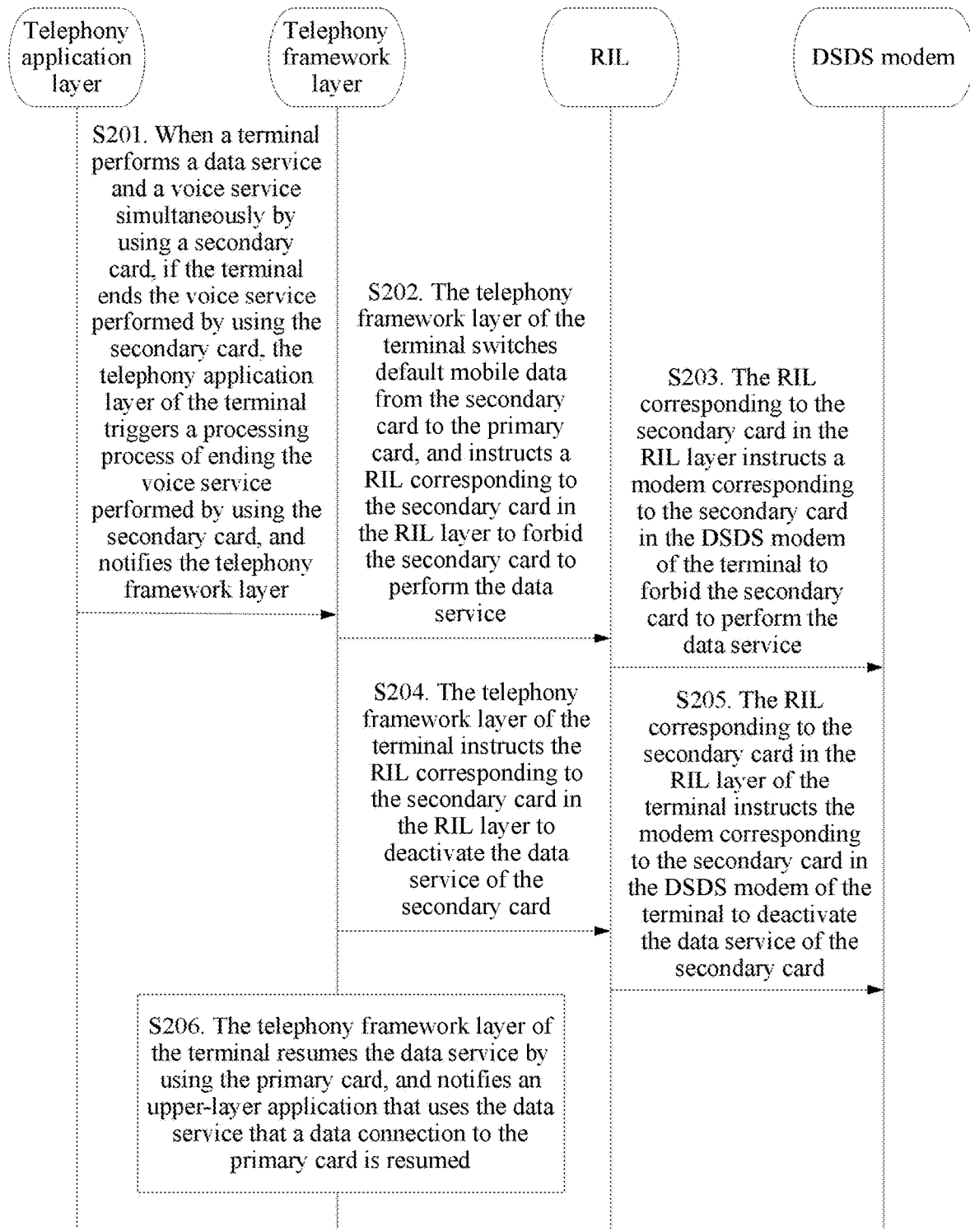
FIG. 11 is a schematic flowchart 2 of a method for supporting a voice service and a data service simultaneously according to an embodiment of the present invention.
Figure 14:
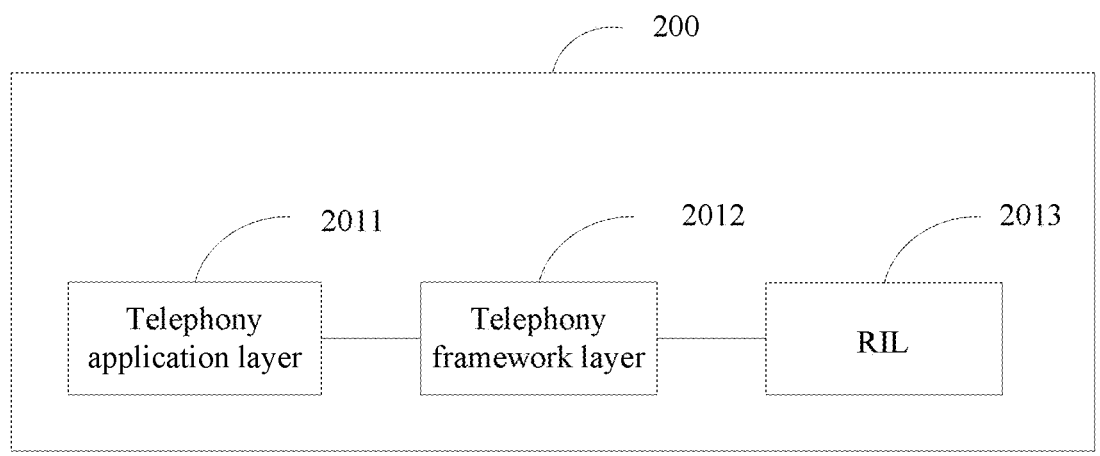
FIG. 14 is a schematic structural diagram 1 of a terminal according to an embodiment of the present invention.

When each function module is obtained through division corresponding to each function, FIG. 14 is a possible schematic structural diagram of the terminal in the foregoing embodiment. A terminal 200 includes a telephony application layer 2011, a telephony framework layer 2012, and a RIL 2013. The telephony application layer 2011 is configured to support the terminal 200 in performing the process S101 shown in FIG. 5 and the process S201 shown in FIG. 11. The telephony framework layer 2012 is configured to support the terminal 200 in performing the processes S102, S104, and S105 shown in FIG. 5, the processes S202, S204, and S206 shown in FIG. 11, and functions of the object GsmCdmaCallTracker, the object InCallDataStateMachine, the object SubscriptionController, the object PhoneSwitcher, the object TelephonyNetworkFactory, the object DcTracker, and the object DataConnection that are shown in FIG. 9A, FIG. 9B, FIG. 9C, FIG. 13A, and FIG. 13B. The RIL 2013 is configured to support the terminal 200 in performing the processes S103 and S106 that are shown in FIG. 5, the processes S203 and S205 that are shown in FIG. 11, and functions of the RILJ client and the MUD server end that are shown in FIG. 9A, FIG. 9B, FIG. 9C, FIG. 13A, and FIG. 13B. All content related to the steps in the foregoing method embodiments may be cited in function descriptions of corresponding function modules. Details are not described herein.

Figure 15:
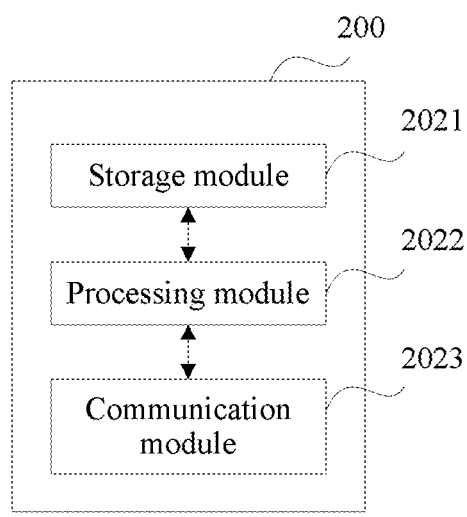
FIG. 15 is a schematic structural diagram 2 of a terminal according to an embodiment of the present invention.

When an integrated unit is used, FIG. 15 is a possible schematic structural diagram of the terminal in the foregoing embodiment. A terminal 200 includes a processing module 2022 and a communications module 2023. The processing module 2022 is configured to control and manage an action of the terminal 200. For example, the processing module 2022 is configured to support the terminal 200 in performing functions of the telephony application layer 2011, the telephony framework layer 2012, and the RIL 2013. The communications module 2023 is configured to support the terminal in communicating with another device. The terminal 200 may further include a storage module 2021, configured to store program code and data of the terminal.

The processing module 2022 may be a processor or a controller, for example, may be a central processing unit (Central processing unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The controller/processor may implement or execute various example logical blocks, modules, and circuits described with reference to content disclosed in the embodiments of the present invention. Alternatively, the processor may be a combination of processors implementing a computing function, for example, a combination of one or more microprocessors, or a combination of a DSP and a microprocessor. The communications module 2023 may be a transceiver, a transceiver circuit, a network interface, a communications interface, or the like. The storage module 2021 may be a memory.

Specifically, the processing module 2022 may be the processor 280 in FIG. 2, the communications module 2023 may be the RF circuit 210, the Wi-Fi module 270, the Bluetooth module 281 in FIG. 2, and the storage module 2021 may be the memory 220 in FIG. 2.

Figure 16:
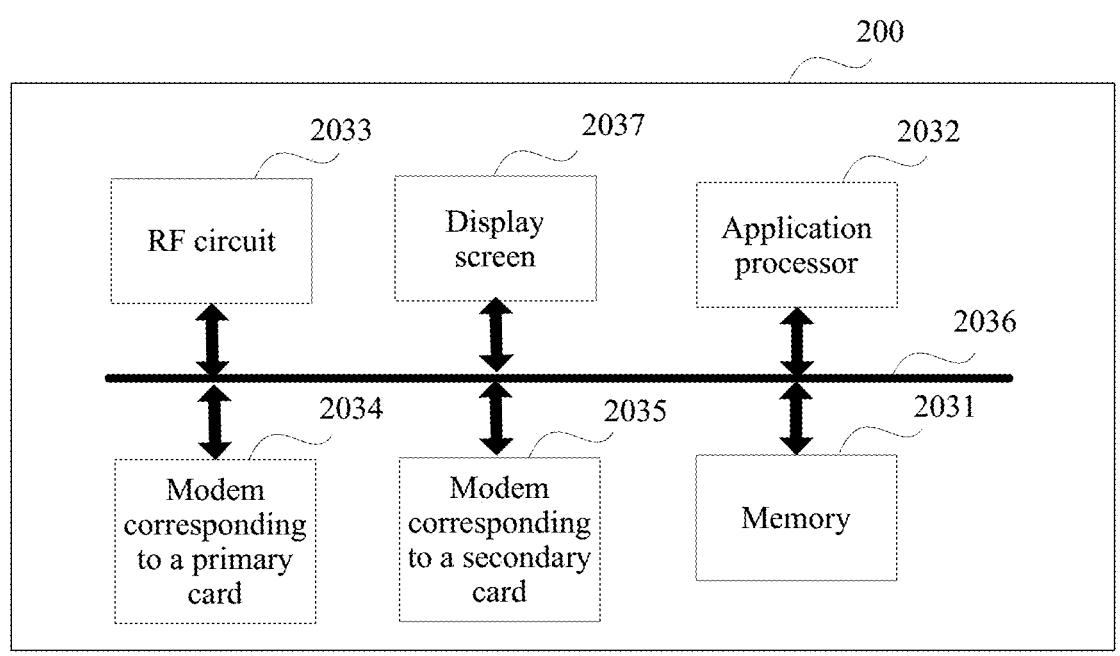
FIG. 16 is a schematic structural diagram 3 of a terminal according to an embodiment of the present invention.

When the processing module 2022 is an application processor and a modem, the communications module 2023 is an RF circuit, and the storage module 2021 is a memory, the terminal in this embodiment of the present invention may be a terminal 200 shown in FIG. 16.

Referring to FIG. 16, the terminal 200 includes: a memory 2031, an application processor 2032, an RF circuit 2033, a modem 2034 corresponding to a primary card, a modem 2035 corresponding to a secondary card, and a bus 2036. The memory 2031, the application processor 2032, the RF circuit 2033, the modem 2034 corresponding to the primary card, and the modem 2035 corresponding to the secondary card communicate with each other by using the bus 2036. The bus 2036 may be a peripheral component interconnect bus, an extended industrial standard architecture bus, or the like. The bus may be classified into an address bus, a data bus, a control bus, and the like. For ease of representation, only one thick line is used to represent the bus in the figure, but this does not mean that there is only one bus or only one type of bus. The memory 2031 stores one or more programs, the one or more programs include an instruction, and when the instruction is executed by the terminal, the terminal is enabled to perform a related method in any one of FIG. 5, FIG. 9A, FIG. 9B, FIG. 9C, FIG. 11, FIG. 13A, and FIG. 13B.

Further, because the telephony application layer, the telephony framework layer, and the RIL run in the application processor 2032, the application processor 2032 may execute the instruction, to implement the method performed by the telephony application layer, the telephony framework layer, and the RIL in FIG. 5, FIG. 9A, FIG. 9B, FIG. 9C, FIG. 11, FIG. 13A, and FIG. 13B. For example, the application processor 2032 may be configured to: when a data service is performed by using the modem 2034 corresponding to the primary card, if a voice service is performed by using the modem 2035 corresponding to the secondary card, switch the data service performed by using the modem 2034 corresponding to the primary card to the modem 2035 corresponding to the secondary card, and perform the data service by using the modem 2035 corresponding to the secondary card.

Optionally, referring to FIG. 16, the terminal 200 may further include: a display screen 2037, and the display screen 2037 is connected to another component also by using the bus 2036.

Optionally, the application processor 2032 is further configured to control the display screen 2037 to display an option interface, and content displayed in the option interface is used to indicate that default mobile data is switched from the primary card to the secondary card when the voice service is performed by using the modem 2035 corresponding to the secondary card.

Optionally, the application processor 2032 is further configured to control the display screen 2037 to display first prompt information, and the first prompt information is used to indicate that default mobile data is switched from the primary card to the secondary card when the voice service is performed by using the modem 2035 corresponding to the secondary card.

Optionally, the application processor 2032 is further configured to: end the voice service performed by using the modem 2035 corresponding to the secondary card, switch the data service performed by using the modem 2035 corresponding to the secondary card to the modem 2034 corresponding to the primary card, and perform the data service by using the modem 2034 corresponding to the primary card.

Optionally, the application processor 2032 is further configured to control the display screen 2037 to display an option interface, and content displayed in the option interface is used to indicate that the default mobile data is switched from the secondary card to the primary card after the voice service performed by using the modem 2035 corresponding to the secondary card ends.

Optionally, the application processor 2032 is further configured to control the display screen 2037 to display second prompt information, and the second prompt information is used to indicate that the default mobile data is switched from the secondary card to the primary card after the voice service performed by using the modem 2035 corresponding to the secondary card ends.

Optionally, the application processor 2032 is further configured to control the display screen 2037 to display an option interface, and content displayed in the option interface is used to indicate whether a function that the internet can be accessed by using the secondary card that is being used in a call is enabled.

An embodiment of the present invention further provides an electronic device. The electronic device includes: a display, one or more processors, a memory, and one or more programs. The one or more programs are stored in the memory and are configured to be executed by the one or more processors, and the one or more programs include an instruction for the following operations: when a user interface including a setting icon is displayed on the display, displaying a setting option in response to a first input, where the setting option includes a first option; and displaying a first option interface in response to a second input, where the first option interface includes at least one area, and the at least one area displays a default mobile data option and an option that the internet can be accessed by using a secondary card that is being used in a call. The first option may be a dual SIM management option, or the first option may be a mobile network setting option.

An embodiment of the present invention further provides a computer storage medium that stores one or more programs. The one or more programs include an instruction, and when the instruction is executed by a terminal, the terminal is enabled to perform a related method in any one of FIG. 5, FIG. 9A, FIG. 9B, FIG. 9C, FIG. 11, FIG. 13A, and FIG. 13B.

An embodiment of the present invention further provides a computer program product including an instruction. When the computer program product is run on a terminal, the terminal is enabled to perform a related method in any one of FIG. 5, FIG. 9A, FIG. 9B, FIG. 9C, FIG. 11, FIG. 13A, and FIG. 13B.

The terminal, the electronic device, the computer storage medium, and the computer program product provided in the embodiments of the present invention are configured to perform a corresponding method provided above. Therefore, for beneficial effects that can be achieved by the terminal, the electronic device, the computer storage medium, and the computer program product, refer to beneficial effects in the corresponding method provided above. Details are not described herein again.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented as required, that is, an inner structure of an apparatus is divided into different function modules to implement all or some of the functions described above. For a detailed working process of the foregoing apparatus and unit, refer to a corresponding process in the foregoing method embodiments, and details are not described herein again.

Function units in the embodiments of the present invention may be integrated into one processing unit, or each of the units may exist alone physically, or two or more units are integrated into one unit. The integrated unit may be implemented in a form of hardware.

When the integrated unit is implemented in the form of a software function unit and sold or used as an independent product, the integrated unit may be stored in a computer-readable storage medium. Based on such an understanding, the technical solutions in the embodiments of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The storage medium includes: any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

The invention claimed is:

1. A method implemented by a dual subscriber identity module (SIM), dual-standby, single-pass terminal supporting a primary card and a secondary card, wherein the primary card supports a data service, wherein the secondary card supports a target service, wherein the target service is a voice service over packet switched (PS) domain, and wherein the method comprises:
displaying a first option interface comprising a switch, wherein the switch is configured to set whether a first function is enabled, and wherein the first function is switching the data service from the primary card to the secondary card when the secondary card performs the target service;
enabling, in response to an operation on the switch, the first function;
performing a first data service using the primary card;
in response to performing the target service using the secondary card and the first function being enabled, switching the first data service to the secondary card and performing the first data service and the target service using the secondary card; and
in response to performing another voice service using the secondary card and the first function being enabled, not switching the first data service to the secondary card.

2. The method of claim 1, further comprising displaying, on the first option interface, content indicating that default mobile data is switched from the primary card to the secondary card when the target service is performed using the secondary card.

3. The method of claim 1, further comprising displaying first prompt information, wherein the first prompt information indicates that default mobile data is switched from the primary card to the secondary card when the target service is performed using the secondary card.

4. The method of claim 1, further comprising:
ending the target service performed using the secondary card;
switching the first data service performed using the secondary card to the primary card; and
performing the first data service using the primary card.

5. The method of claim 4, further comprising displaying a second option interface comprising content, wherein the content indicates that default mobile data is switched from the secondary card to the primary card after the target service performed using the secondary card ends.

6. The method of claim 4, further comprising displaying second prompt information, wherein the second prompt information indicates that default mobile data is switched from the secondary card to the primary card after the target service performed using the secondary card ends.

7. The method of claim 1, further comprising displaying, on the first option interface, content indicating whether the first function is enabled.

8. The method of claim 1, wherein dual SIM, dual-standby, single-pass comprises that the primary card and the secondary card are in standby and only one of the primary card or the secondary card is used for calls.

9. The method of claim 1, wherein the dual SIM, dual-standby, single-pass terminal comprises an operating system, wherein the operating system includes a telephony framework layer, a first radio interface layer (RIL) corresponding to the primary card, and a second RIL corresponding to the secondary card, and wherein the method further comprises:
instructing, by the telephony framework layer, the second RIL to allow the secondary card to perform the first data service; and
skipping sending, by the telephony framework layer to the first RIL, an indication indicating that the first data service of the primary card is forbidden to be performed.

10. The method of claim 1, wherein the dual SIM, dual-standby, single-pass terminal comprises an operating system, wherein the operating system includes a telephony framework layer, and wherein the method further comprises:

performing, by a DcTracker object of the telephony framework layer, deactivation of the first data service of the primary card;

skipping sending, by the telephony framework layer, an instruction for deactivating the first data service of the primary card; and directly returning a response indicating sending success in a function for sending the instruction for deactivating the first data service of the primary card.

11. The method of claim 1, further comprising:

launching a second data service during execution of the target service; and performing the second data service using the secondary card by default instead of the primary card.

12. A dual subscriber identity module (SIM), dual-standby, single-pass terminal configured to support a primary card and a secondary card, wherein the dual SIM, dual-standby, single-pass terminal comprises:

a first modem coupled to the primary card and configured to support a data service;

a second modem coupled to the secondary card and configured to support a target service, wherein the target service is a voice service over packet switched (PS) domain;

a display screen; and one or more processors coupled to the first modem, the second modem, and the display screen and configured to:

display a first option interface on the display screen, wherein the first option interface comprises a switch, wherein the switch is configured to set whether a first function is enabled, and wherein the first function is switching the data service from the primary card to the secondary card when the secondary card performs the target service;

enable, in response to an operation on the switch, the first function;

perform a first data service using the first modem coupled to the primary card;

in response to performing the target service using the second modem and the first function being enabled, switch the first data service to the second modem and perform the first data service and the target service using the second modem; and in response to performing another voice service using the secondary card and the first function being enabled, not switch the first data service to the secondary card.

13. The dual SIM, dual-standby, single-pass terminal of claim 12, wherein the one or more processors are further configured to display, on the first option interface, content indicating that default mobile data is switched from the primary card to the secondary card when the target service is performed using the second modem.

14. The dual SIM, dual-standby, single-pass terminal of claim 12, wherein the one or more processors are further configured to display first prompt information on the display screen, and wherein the first prompt information indicates that default mobile data is switched from the primary card to the secondary card when the target service is performed using the secondary card.

15. The dual SIM, dual-standby, single-pass terminal of claim 12, wherein the one or more processors are further configured to:

end the target service performed using the second modem;

switch the first data service performed using the second modem to the first modem; and perform the first data service using the first modem.

16. The dual SIM, dual-standby, single-pass terminal of claim 15, wherein the one or more processors are further configured to display a second option interface comprising content, and wherein the content indicates that default mobile data is switched from the secondary card to the primary card after the target service performed using the second modem ends.

17. The dual SIM, dual-standby, single-pass terminal of claim 15, wherein the one or more processors are further configured to display second prompt information indicating that default mobile data is switched from the secondary card to the primary card after the target service performed using the second modem ends.

18. The dual SIM, dual-standby, single-pass terminal of claim 12, wherein the one or more processors are further configured to display, on the first option interface, content indicating whether the first function is enabled.

19. The dual SIM, dual-standby, single-pass terminal of claim 12, wherein dual SIM, dual-standby, single-pass comprises that the primary card and the secondary card are in standby and only a single one of the primary card or the secondary card is used for calls.

20. A method implemented by a dual subscriber identity module (SIM), dual-standby, single-pass terminal, wherein the dual SIM, dual-standby, single-pass terminal supports a primary card and a secondary card, wherein the primary card supports a data service, wherein the secondary card supports a target service, wherein the target service is a voice service over packet switched (PS) domain, and wherein the method comprises:

displaying a first option interface comprising a switch, wherein the switch is configured to set whether a first function is enabled, and wherein the first function is switching the data service from the primary card to the secondary card when the secondary card performs the target service;

enabling, in response to an operation on the switch, the first function;

when a first data service is launched during execution of the target service using the secondary card and the first function is enabled, performing the first data service using the secondary card by default instead of the primary card according to the first function; and when a second data service is launched during execution of another voice service using the secondary card and the first function is enabled, perform the second data service using the primary card by default.

21. A dual subscriber identity module (SIM), dual-standby, single-pass terminal, wherein the dual SIM, dual-standby, single-pass terminal is configured to support a primary card and a secondary card, wherein the primary card is configured to support a data service, wherein the secondary card is configured to support a target service, wherein the target service is a voice service over packet switched (PS) domain, and wherein the dual SIM, dual-standby, single-pass terminal comprises:

a first modem coupled to the primary card;

a second modem coupled to the secondary card;

a display screen; and one or more processors coupled to the first modem, the second modem, and the display screen and configured to:

display a first option interface on the display screen, wherein the first option interface comprises a switch, wherein the switch is configured to set whether a first function is enabled, and wherein the first function is switching the data service from the primary card to the secondary card when the secondary card performs the target service;

enable, in response to an operation on the switch, the first function;

when a first data service is launched during execution of the target service using the second modem coupled and the first function is enabled, perform the first data service using the second modem by default instead of the primary card according to the first function; and when the first data service is launched during execution of another voice service and the first function is enabled, perform the first data service using the first modem by default.

* * * * *